US005878584A

United States Patent [19]

Sasaki et al.

[11] Patent Number: 5,878,584

[45] Date of Patent: Mar. 9, 1999

[54] AIR CONDITIONER WITH SOLAR GENERATOR

[75] Inventors: Shigeharu Sasaki, Ota; Keigo Onizuka, Gunma-Ken; Hisashi Tokizaki, Gunma-ken; Masaki Madenokoji, Honjo; Kenichi Koga, Higashiohsaka, all of Japan

[73] Assignee: Sanyo Electric Co., Ltd., Ohsaka-fu, Japan

[21] Appl. No.: 662,502

[22] Filed: Jun. 13, 1996

[30] Foreign Application Priority Data

| | | | |
|---|---|---|---|
| Jun. 13, 1995 | [JP] | Japan | 7-146599 |
| Aug. 2, 1995 | [JP] | Japan | 7-197631 |
| Aug. 9, 1995 | [JP] | Japan | 7-203467 |
| Aug. 9, 1995 | [JP] | Japan | 7-203469 |

[51] Int. Cl.[6] .............................. F25B 27/00; H02J 3/02

[52] U.S. Cl. .............................. 62/115; 62/236; 307/22; 323/906

[58] Field of Search .............................. 136/206; 62/236, 62/235.1; 323/906; 307/22, 64

[56] References Cited

U.S. PATENT DOCUMENTS

| | | | |
|---|---|---|---|
| 4,163,194 | 7/1979 | Ross | 323/906 X |
| 4,750,102 | 6/1988 | Yamano et al. | 363/142 |
| 5,375,429 | 12/1994 | Tokizaki et al. | 62/236 X |
| 5,493,155 | 2/1996 | Okamoto et al. | 323/906 |
| 5,495,722 | 3/1996 | Manson et al. | 236/51 X |
| 5,560,218 | 10/1996 | Jang | 62/236 |
| 5,576,533 | 11/1996 | Tantraporn | 323/906 |
| 5,592,074 | 1/1997 | Takehara | 323/906 |

FOREIGN PATENT DOCUMENTS

| | | |
|---|---|---|
| 6-74522 | 3/1994 | Japan . |
| 06169573 | 6/1994 | Japan . |

*Primary Examiner*—William Wayner
*Attorney, Agent, or Firm*—Knobbe, Martens, Olson & Bear, LLP

[57] ABSTRACT

An air conditioner equipped with a solar generator is disclosed. The solar generator is capable of converting the DC power generated by a solar cell into the AC power whose voltage and frequency correspond to that of the commercial power source. The electrical power generated by the solar cell and the electrical power consumed by the air conditioner are monitored and may be displayed. The DC power generated by the solar cell is used directly by the air conditioner or used indirectly as the commercial power source by merging the converted AC power to the commercial power source. Further, the converted AC power may be selectively merged to the commercial power source depending on the various states of the air conditioner, and the air conditioning operations may be regulated depending on the electrical power generated by the solar cell.

13 Claims, 22 Drawing Sheets

( ) FIGURES IN PARENTHESES ARE EXAMPLES
C=(0.01μF) CX=(0.056μF)

AIR CONDITIONER WITH SOLAR GENERATOR

BACKGROUND OF THE INVENTION

1. Field of the Invention

The present invention relates to an air conditioner for air conditioning an interior, and in particular, to an air conditioner equipped with a solar battery which generates electric power by using sunlight as an energy source and supplies the generated electric power to a commercial electric power source.

2. Description of the Related Art

An air conditioner which air conditions an interior effects heat exchange with a ryefrigerant so as to operate in various operation modes such as, for example, “heating mode”, “cooling mode”, “dry mode”, and “automatic operation mode” in which a set temperature and the temperature at the time of the start of operation are compared and one of the heating mode and the cooling mode are automatically selected. In this type of air conditioner, various operation settings such as operate/stop, operation mode setting, operation condition setting and the like can be carried out by remote operation by using a remote control which is an accessory of the air conditioner.

A so-called solar air conditioner which uses solar energy as power has been developed as the above-described type of air conditioner (see, for example, U.S. patent application Ser. No. 5,375,429). In this solar air conditioner, the power generated in accordance with the sunlight absorbed by a solar cell is used as the power of the air conditioner. Further, because the generated power is affected by the weather and the time of day, the solar air conditioner is used together with a commercial power source which is used conventionally. The allocation of the use of power generated from sunlight and the use of power from the commercial power source is controlled in accordance with the amount of power generated from sunlight, so that stable air conditioning operation can be guaranteed.

In the solar air conditioner having the above-described structure, the power generated by sunlight can only be used for the solar air conditioner. Therefore, when the solar air conditioner is not being operated or the like, regardless of the energy generating capability, power from sunlight cannot be used effectively.

As a result, supplying the power generated by the solar air conditioner to a general commercial power source has been proposed. Such a solar air conditioner has a power source supplying system which supplies the power generated from sunlight as commercial power, and uses commercial power together with the power generated from sunlight. In this way, the power generated from sunlight can be used effectively.

However, when the power generated from sunlight is supplied as commercial power, in order to monitor the amount of supplied power, an expensive measuring device is needed. Further, even if the solar generator includes a function for displaying the power generating state, the power generating state cannot be verified easily because the solar generator is located outside (i.e., at the exterior).

Because the conventional solar generator generates a relatively large amount of power, the devices for managing and controlling the generated power are relatively large. As compactness of air conditioners used for ordinary households is aimed for, if the solar generator which is formed integrally with the air conditioner is large, installation will be difficult. In the solar generator, the frequency, voltage and phase of the generated power must accurately match those of the commercial power. Further, in order to prevent overloading of the solar generator, interruption of the commercial power source must be accurately detected. Carrying out these detections and controls individually results in the structure of the solar generator becoming complex and in the solar generator becoming large.

When the solar generator is controlled by using the commercial power source, at times when the commercial power source is interrupted or the like, operation of the solar generator is stopped, and appropriate self-monitoring of the solar generator is not possible.

In a case in which, for example, there is a room which is to always be kept at a predetermined temperature or humidity, the consumed power from the commercial power source may vary due to the weather or the time of day so that electricity costs cannot be estimated and unforeseen expenses may result. Accordingly, a solar air conditioner which can furnish power only by solar energy is desirable. However, in order to realize such a solar air conditioner, a solar cell of an extremely large surface area would be required, which is impractical.

SUMMARY OF THE INVENTION

In view of the aforementioned, an object of the present invention is to provide an air conditioner equipped with a solar generator in which the power generating state of generating power by sunlight can be easily confirmed inside (i.e., at an interior).

Another object of the present invention is to provide a solar generator which has a simple structure and is compact, and in which appropriate management of outputted power and protection of the solar generator are possible.

Yet another object of the present invention is to provide a solar power generator in which appropriate operations and monitoring can be carried out with a simple structure even if a commercial power source is interrupted, and which can output stable alternating current power.

Still another object of the present invention is to provide a solar generator which can output the commercial power source alternating current whose frequency, voltage and phase are made to match those of the commercial power.

Another object of the present invention is to provide a unit for supplying power generated from solar energy as a commercial power source which can detect the existence of an interruption of the commercial power source, i.e., of operation of a commercial power source supplying system alone, quickly and with high accuracy and with a simple structure.

Yet another object of the present invention is to provide an air conditioner equipped with a commercial power source supplying function which can suppress consumption of commercial power even if the air conditioner is operated continuously over a long period of time, even when a solar cell whose use is feasible from the point of view of practicality is used.

A first aspect of the present invention is an air conditioner comprising: an air conditioning operation section which effects air conditioning operation of an interior to be air conditioned by circulating a refrigerant which carries out heat exchange between an interior unit provided at the interior and an exterior unit provided at an exterior; a power generating section provided at the exterior and collecting sunlight and generating power from the sunlight; and a display section displaying operation information of said power generating section.

In accordance with the first aspect of the present invention, information regarding the operation of the power generating section and the inverter section is outputted to the air conditioner operation section from the control section of the solar generator. The operation information outputted from the control section of the solar generator is displayed on the display section which is at the interior unit or the remote control of the air conditioner operation section. In this way, the operating state of the solar generator which is at the exterior (outside) can be easily confirmed at an interior (inside) by the interior unit or the remote control which are disposed in the interior.

A second aspect of the present invention is an air conditioner comprising: an air conditioning operation section which effects air conditioning operation of an interior to be air conditioned by circulating a refrigerant which carries out heat exchange between an interior unit provided at the interior and an exterior unit provided at an exterior; a power generating section provided at the exterior and collecting sunlight and generating power from the sunlight; an inverter section converting a voltage and a frequency of the power generated at said power generating section into a voltage and a frequency of power of a commercial power source, and outputting to the commercial power source the power whose voltage and frequency have been converted; and a display section displaying, as the operation information of said power generating section, the power generated by said power generating section and one of outputted current and outputted power outputted from said inverter section to the commercial power source.

In accordance with the second aspect, information expressing the generated power of the power generating section and the power outputted from the solar generator is displayed on the display section. In this way, there is no need to separately provide a measuring device for measuring the generated power of the power generating section (the generated voltage, the generated current), the power outputted from the solar generator as commercial power (the outputted current) or the like. The cost of the solar generator can thereby be kept down.

A third aspect of the present invention is an air conditioner comprising: a power generating section collecting sunlight and generating power; an inverter section converting a voltage and a frequency of the power generated by said power generating section into a voltage and a frequency of a commercial power source, and outputting the power whose voltage and frequency have been converted; a breaking section which disconnects said inverter section from the commercial power source by opening a contact provided at a point of connection between said inverter section and the commercial power source; a generated power detecting section which detects the power generated by said power generating section; a network interruption detecting section which detects interruptions of the commercial power source; a network power detecting section for detecting the voltage, the frequency and a phase of the commercial power source; and a control section which, on the basis of results of detection of said generated power detecting section and said network power detecting section, controls a voltage, a frequency and a phase of power outputted from said inverter section, and which operates said breaking section on the basis of results of detection of said network interruption detecting section.

The solar generator of the third aspect monitors and controls the output to the commercial power source by a single control section. When an interruption of the commercial power source is detected, the control section stops output from the inverter section.

The generated power detecting section detects the outputted electric current, the outputted voltage and the like of the power generating section. The network power detecting section detects the voltage, frequency and phase of the commercial power source, and the network interruption detecting section detects interruptions or the like of the commercial power source. The control section controls the operation of the inverter section on the basis of these parameters. For example, when generation of power by the power generating section stops, it is necessary to stop the output of the inverter section. When the power generating section is generating power, it is necessary to accurately detect the voltage and frequency of the commercial power source and to operate the inverter section in correspondence with these results of detection. When the commercial power source is interrupted, the inverter section must be disconnected from the commercial power source.

By effecting these various, interrelated controls at a single control section, high-speed, highly accurate control can be realized. Further, because the structure of the solar generator other than the power generating section can be simplified, the mechanism for supplying the power generated at the power generating section to the commercial power source can be made compact so that it is possible to set the solar generator in a small space.

A fourth aspect of the present invention is a solar generator which collects sunlight by a solar cell of a power generating section, and converts a voltage and a frequency of generated direct current power into a voltage and frequency corresponding to a commercial power source, and outputs the power whose voltage and frequency have been converted, comprising: an inverter section provided between the power generating section and an output of said solar generator, and operating in accordance with supplied switching signals, and converting direct current power into alternating current power by at least two switching elements which alternately allow power to pass through and cut off the power between an input end from the power generating section and an output end to the output of said solar generator; an inverter controlling section for supplying predetermined switching signals to the switching elements when the power generating section is in a power generating state; rectifier elements provided between said input end and said output end in parallel with the respective switching elements of said inverter section, and allowing power to pass from said output end to said input end when the switching elements are in a non-operating state; and a power source section connected to an input end of said inverter section, and converting direct current power into power of a predetermined constant voltage, and supplying the power to an interior of said solar generator.

In the fourth aspect, the direct current power generated at the power generating section is converted into alternating current by switching elements of the inverter section allowing power to pass through and cutting off power (ON/OFF) in accordance with switching signals, and the alternating current power is outputted. At this time, a waveform corresponding to single phase 100 V of the commercial power source can be outputted by using two switching elements. Further, because the power source section is connected to the input end of the inverter section, power generated at the power generating section is supplied to the power source section.

In a case in which generation of power at the power generating section stops, at the inverter section, power from the commercial power source is inputted from the output end because the switching elements are not operating. After being rectified by the rectifier elements, power is supplied to the power source section from the input end.

In this way, commercial power is supplied to the power source section at night or the like when the power generating section is stopped. When the power generating section is in a power generating state, the power generated thereat is supplied to the power source section. As a result, even if the commercial power source stops, power is supplied to the power source section. Therefore, appropriate control and monitoring at the interior portion of the solar generator are possible. Further, because there is no need to change a storage battery or the power source or the like, the structure is extremely simple.

A fifth aspect of the present invention is a solar generator which collects sunlight by a solar cell of a power generating section, and converts a voltage and a frequency of generated direct current power into a voltage and frequency corresponding to a commercial power source, and outputs the power whose voltage and frequency have been converted, comprising: an inverter section provided between the power generating section and an output of said solar generator, and converting direct current power into alternating current power by four switching elements, which are connected in a bridge form between an input end from the power generating section and an output end to the output of said solar generator, operating in accordance with switching signals supplied to the respective switching elements so as to alternately allow power to pass through and cut off the power between said input end and said output end; an inverter controlling section for supplying predetermined switching signals to the switching elements when the power generating section is in a power generating state; rectifier elements provided between said input end and said output end in parallel with the respective switching elements of said inverter section, and allowing power to pass from said output end to said input end when the switching elements are in a non-operating state; and a power source section connected to an input end of said inverter section, and converting direct current power into power of a predetermined constant voltage, and supplying the power to an interior of said solar generator.

In the fifth aspect, the switching elements are connected in a bridge form, and a waveform corresponding to single phase 200 V of the commercial power source can thereby be outputted. At this time, even if generation of power at the power generating section is stopped, the power of the commercial power source is rectified by the rectifier elements provided parallel to the respective switching elements and is supplied to the power source section. Therefore, appropriate control at the interior portion of the solar generator is possible.

Even if six switching elements are used and three-phase alternating current power is outputted, rectifier elements can be provided parallel to the respective switching elements.

A sixth aspect of the present invention is a solar generator which collects sunlight by a solar cell of a power generating section, and converts a voltage and a frequency of generated direct current power into a voltage and frequency corresponding to a commercial power source, and outputs the power whose voltage and frequency have been converted, comprising: an inverter section provided between the power generating section and an output of said solar generator to the commercial power source, and converting direct current power to alternating current power of a quasi-sinewave by operation of switching elements in accordance with predetermined switching signals, and outputting the alternating current power; a network power detecting section detecting variations in an instantaneous value of alternating current power of the commercial power source; and an inverter control section determining, from results of detection by said network power detecting section, a zero cross point at which the instantaneous value becomes zero, and outputting the switching signals so that a phase of the alternating current power of the quasi-sinewave coincides with a phase of the alternating current power of the commercial power source at a predetermined timing.

In the sixth aspect, the switching elements are operated by switching signals, and the direct current power is converted into alternating current power. At this time, alternating current power whose frequency and voltage have been made to match those of the commercial power source on the basis of PWM theory is outputted.

At the network power detecting section, for example, instantaneous values of the alternating current voltage of the commercial power source are detected, and the zero cross point at which the voltage becomes 0 V is determined from the variations in the instantaneous value. At the inverter control section, the switching signals are outputted at a predetermined timing which is based on the results of this determination, and the switching elements are operated.

The timing at which the switching signals are outputted may be set by taking into consideration the time until the zero cross point is determined from the inverter control section, and the delay time from the time the zero cross point is determined to the time the switching elements are actually operated at the inverter control section. The switching signals may be outputted so that the starting up of the alternating current waveform by the switching signals is carried out such that the zero cross point of the power outputted from the inverter section and the zero cross point of the commercial power coincide.

In this way, alternating current power whose phase matches that of the commercial power source can be outputted from the inverter section.

A seventh aspect of the present invention is a unit for supplying power generated from solar energy to a commercial power source, for supplying to a commercial power source power generated by using sunlight as an energy source, comprising: a solar cell collecting sunlight; a power generating section for generating direct current power on the basis of light collected by said solar cell; an inverter section converting the direct current power generated at said power generating section into alternating current power; a transformer section which adjusts voltage of said alternating current power; a power source line electrically connecting a secondary side of said transformer section and a secondary side of a transformer at the commercial power source; a switch disposed on said power source line and able to electrically open and close a connection between said transformer section and the transformer at the commercial power source by predetermined signals; network determining means for determining parameter values of the commercial power source which include a frequency and a voltage; third-order harmonics detecting means, connected to the secondary side of the transformer at the commercial power source, for detecting third-order harmonics; first control means for controlling said inverter section and said transformer section on the basis of parameter values determined by said network determining means; and second control means for controlling said switch to electrically open the connection between said transformer section and the transformer at the commercial power source, in a case in which third-order harmonics are detected at said third-order harmonics detecting means.

In accordance with the seventh aspect, when the commercial power source is interrupted, i.e., when the primary side of the commercial power source transformer is interrupted, it is necessary to stop the supply of the power generated from solar energy. Here, the third-order harmonics detecting means detects third-order harmonics at the secondary side of the commercial power source transformer which are generated when there is an interruption at the primary side of the commercial power source transformer. The second control means effects control to open the switch. In this way, the power source line is cut off, and the supply of power generated from solar energy is stopped.

In this way, if, for example, work for replacing or repairing electrical lines is being carried out at the commercial power source side, the commercial power source supplying unit is prevented from interfering with this work.

The eighth aspect of the present invention is an air conditioning system having: an air conditioner equipped with a refrigerating cycle which circulates refrigerant and includes a compressor, a condenser, a expansion device and an evaporator, said air conditioner effecting heat exchange between the refrigerant and air supplied to an interior, and supplying air which has been subjected to heat exchange to the interior so that at least one of a temperature and a humidity of the interior becomes a desired state; and a commercial power source supplying mechanism which generates power by using sunlight as an energy source, and which is provided with a function for supplying generated power to a commercial power source, wherein said commercial power source supplying mechanism has: first power detecting section for detecting a supplied amount of the power which is generated by using sunlight as an energy source and supplied to the commercial power source; and an interface section outputting a value detected by said first power detecting section, and said air conditioner has: a rectifier/smoothing section converting alternating current power supplied from the commercial power source into direct current power; an inverter section which allows direct current power obtained from said rectifier/smoothing section to pass through intermittently to the compressor in response to signals, so as to control a rotational frequency of the compressor; a rotational frequency controlling section outputting to said inverter section the signals for adjusting the rotational frequency of the compressor so that at least one of the temperature and the humidity of the interior becomes a desired state; a second power detecting section for detecting one of power consumed at said air conditioner and power consumed at the compressor; and a regulating section which, when a regulating function is effective, corrects the signals for adjusting the rotational frequency of the compressor so that a value detected by said second power detecting section is less than or equal to the value detected by said first power detecting section and obtained via said interface section.

In the ninth aspect of the present invention, in the eighth aspect, said commercial power source supplying mechanism and said air conditioner have respectively different microprocessors.

In accordance with the eighth aspect of the present invention, the air conditioner is equipped with a function for generating power by using sunlight as and energy source and supplying the generated power to interior wiring. However, the air conditioner operates by receiving power from a commercial power source. More specifically, the generation of power and the consumption of power from the commercial power source are controlled separately.

Here, the supplied amount (hereinafter referred to as generated power) of the power generated by using sunlight as the energy source and supplied to the commercial power source is detected by the first power detecting section. The second power detecting section detects either the power consumed at the air conditioner or the power consumed at the compressor (hereinafter referred to as consumed power).

The detected values of the first and second power detecting sections are compared, and the rotational frequency of the compressor is corrected so that the power consumed by the compressor does not exceed the generated power of the solar cell. More specifically, the operation of the compressor is operation corresponding to the portion of the power provided by the generated power of the solar cell. In a state in which the generated power is near a maximum such as when there are clear skies or the like, the air conditioner is operated at a high capability. In a case in which the generated power does not increase such as in rainy weather or the like, the capability of the air conditioner is lowered.

Even if an air conditioner in which this type of control is carried out is operated continuously for a long time, e.g., is applied to and continuously operated in a room for which air conditioning is continuously desired or the like, all of the consumed power can be furnished by the generated power. Electricity costs are therefore insignificant.

Further, there is no need to make large the solar equipment for obtaining full capability of the air conditioner (e.g., there is no need to increase the surface area of the solar cell or the like). Because the operation capability of the air conditioner itself is controlled, the equipment does not become complex.

A user may operate a switch to select whether the above described operation capability control is to be carried out.

In accordance with the ninth aspect, the microprocessor, which effects control for generating power by using sunlight as the energy source and supplying the generated power to the commercial power source, and the microprocessor, which effects control for operating the air conditioner, are provided independently. Therefore, maintenance or the like can be carried out independently for each microprocessor. Further, because the microprocessors are controlled independently from one another, each can be used widely for various applications, and the degrees of freedom of combinations of microprocessors increases.

A tenth aspect of the present invention is an air conditioner having a refrigerating cycle which circulates refrigerant and includes a compressor, a condenser, a pressure-reducing device and an evaporator, and effecting heat exchange between the refrigerant and air supplied to an interior, and carrying out air conditioning operation of the interior by supplying air which has been subjected to heat exchange to the interior so that at least one of a temperature and a humidity of the interior becomes a desired state, said air conditioner equipped with a commercial power source supplying function generating power by using sunlight as an energy source and having a function for supplying generated power to a commercial power source, said air conditioner further comprising: a rectifier/smoothing section converting alternating current power supplied from the commercial power source into direct current power; an inverter section which allows direct current power obtained from said rectifier/smoothing section to pass through intermittently to the compressor in response to signals, so as to control a rotational frequency of the compressor; a rotational frequency controlling section outputting to said inverter section the signals for adjusting the rotational frequency of the compressor so that at least one of the temperature and the humidity of the interior becomes a desired state; a power supplying section which adds the power generated by using sunlight as an energy source with direct current power outputted from said rectifier/smoothing section; and a control section which preferentially adds the power generated by using sunlight as an energy source with the direct current power outputted from said rectifier/smoothing section when said air conditioner is carrying out air conditioning operation, and which preferentially supplies to the commercial power source the power generated by using sunlight as an energy source when said air conditioner is not carrying out air conditioning operation.

An eleventh aspect of the present invention is an air conditioner having a refrigerating cycle which circulates refrigerant and includes a compressor, a condenser, a expansion device and an evaporator, and effecting heat exchange between the refrigerant and air supplied to an interior, and carrying out air conditioning operation of the interior by supplying air which has been subjected to heat exchange to the interior so that at least one of a temperature and a humidity of the interior becomes a desired state, said air conditioner equipped with a commercial power source supplying function generating power by using sunlight as an energy source and having a function for supplying generated power to a commercial power source, said air conditioner further comprising: a rectifier/smoothing section converting alternating current power supplied from the commercial power source into direct current power; an inverter section which allows direct current power obtained from said rectifier/smoothing section to pass through intermittently to the compressor in response to signals, so as to control a rotational frequency of the compressor; a rotational frequency controlling section outputting to said inverter section the signals for adjusting the rotational frequency of the compressor so that at least one of the temperature and the humidity of the interior becomes a desired state; a power supplying section which adds the power generated by using sunlight as an energy source with direct current power outputted from said rectifier/smoothing section; and a control section which preferentially adds the power generated by using sunlight as an energy source with the direct current power outputted from said rectifier/smoothing section when said air conditioner is carrying out air conditioning operation, and which preferentially supplies to the commercial power source the power generated by using sunlight as an energy source when said air conditioner is not carrying out air conditioning operation; a first power detecting section which detects the power generated by using sunlight as an energy source; a second power detecting section which detects one of power consumed at said air conditioner and power consumed at the compressor; and a regulating section which, when a regulating function is effective, corrects the rotational frequency of the compressor so that a value detected by said second power detecting section is less than or equal to a value detected by said first power detecting section.

According to the twelfth aspect of the present invention, in the eleventh aspect of the present invention, a portion of said air conditioner effecting air conditioning operation and a portion of said air conditioner having the function for supplying to the commercial power source the power generated by using sunlight as an energy source are controlled by the same microprocessor.

In accordance with the tenth aspect, power is generated by using sunlight as an energy source, and the air conditioner is operated by this generated power. At times when the air conditioner is not being operated, the power generating capability is maintained as is, and the generated power is supplied to the commercial power source.

As a result, while the air conditioner is operating, the portion of the needed power which is not provided by the generated power is supplied from the commercial power source in order to operate the air conditioner. Further, when the air conditioner is not being operated, the generated power is supplied to the commercial power source so that sunlight can always be utilized as an energy source. As a result, the amount of supplied power offsets actual electricity costs, and the amount of power consumed from the commercial power source can be reduced.

In accordance with the eleventh aspect, the first power detecting section detects the supplied amount of the power generated by using sunlight as the energy source and supplied to the commercial power source. The second power detecting section detects either the power consumed at the air conditioner or the power consumed at the compressor.

The detected values of the first and second power detecting sections are compared, and signals for adjusting the rotation of the compressor are corrected so that the consumed power does not exceed the generated power. Operation corresponds to the portion of the power provided by the generated power. More specifically, in a state in which the generated power is near a maximum such as when there are clear skies or the like, the air conditioner is operated at full capability. In a case in which the generated power does not increase such as in rainy weather or the like, the capability of the air conditioner is lowered.

Even if an air conditioner in which this control is carried out is operated continuously for a long time, e.g., is applied to and continuously operated in a room for which air conditioning is continuously desired or the like, all of the consumed power can be supplied by the generated power. air conditioning costs are therefore insignificant.

Further, there is no need to make large the solar equipment for obtaining full capability of the air conditioner (e.g., there is no need to increase the surface area of the solar cell or the like). Because the operation capability of the air conditioner itself is controlled, the equipment does not become complex.

A user may operate a switch to select whether the above described operation capability control is to be carried out (i.e., to select whether this function is to be used).

In accordance with the twelfth aspect, the microprocessor, which effects control for generating power by using sunlight as the energy source and supplying the generated power to the commercial power source, and the microprocessor, which effects control for operating the air conditioner, are the same. Therefore, the air conditioner can be made compact.

DESCRIPTION OF THE PREFERRED EMBODIMENTS

[First Embodiment]

Figure 1:
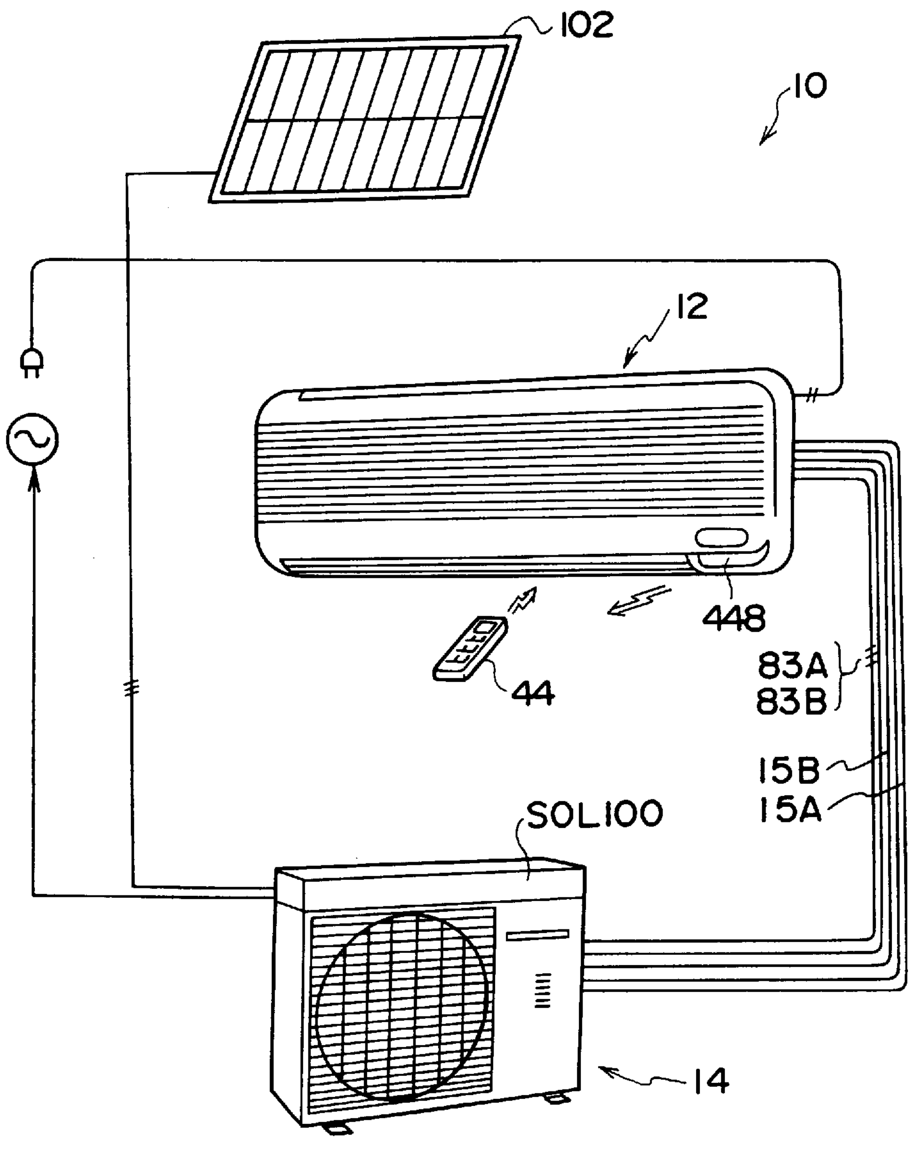
FIG. 1 is a schematic view illustrating a structure of an air conditioner of a first embodiment.

A first embodiment of the present invention will be described hereinafter with reference to the accompanying drawings. FIG. 1 illustrates an air conditioner 10 which is an air conditioner equipped with a solar generator relating to the present embodiment. The air conditioner 10 includes an interior unit 12 and an exterior unit 14. An operation signal (e.g., a signal using infrared rays) transmitted from a remote control switch 44 is received by the interior unit 12. The temperature, air amount, and air direction are set in accordance with the received signal. Stopping of the air conditioner and operation of the air conditioner in accordance with various operation modes such as "heat", "cool", "dehumidify(dry)", and the like are carried out on the basis of this setting.

The exterior unit 14 of the air conditioner 10 is connected to a solar cell 102 which absorbs sunlight and converts the sunlight to electrical energy. The electrical energy generated by the solar cell 102 (hereinafter, "generated power") is inputted to a commercial power source supplying unit (hereinafter, "SOL 100") mounted to the exterior unit 14. The SOL 100 and the solar cell 102 form a solar generator 11.

The SOL 100 can be operated separately from the interior unit 12 and the exterior unit 14 of the air conditioner 10. More specifically, even if the interior unit 12 and the exterior unit 14 of the air conditioner 10 are stopped, the SOL 100 can be operated. Further, even when the SOL 100 is stopped during the night or the like, air conditioning operation of the interior unit 12 and the exterior unit 14 is possible.

First, the interior unit 12 and the exterior unit 14 of the air conditioner 10 will be described.

Figure 2:
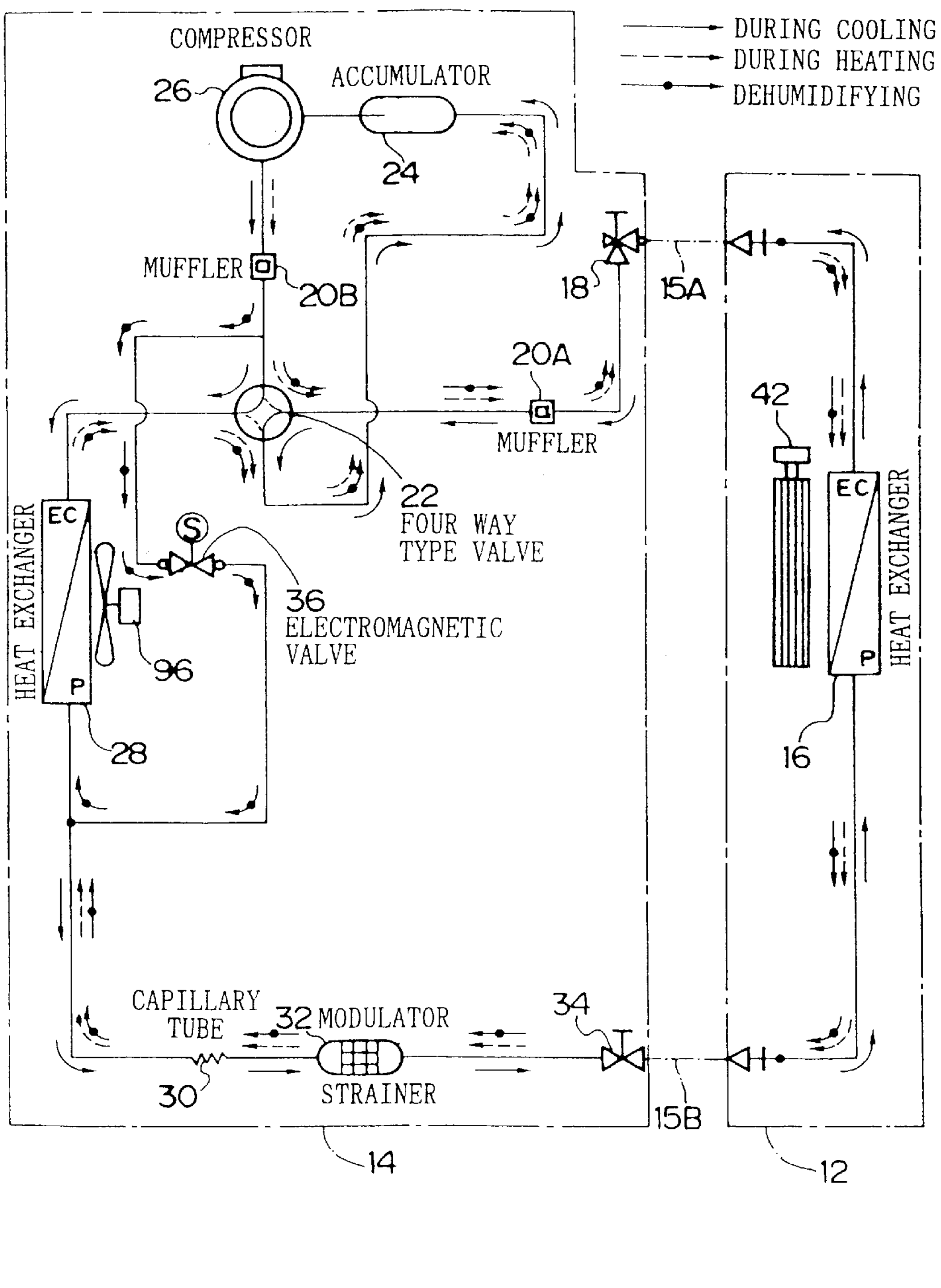
FIG. 2 is a schematic view illustrating a refrigerant conduit of the air conditioner of the first embodiment.

As illustrated in FIG. 2, a wide refrigerant piping 15A and a narrow refrigerant piping 15B which circulate refrigerant are provided between the interior unit 12 and the exterior unit 14 of the air conditioner 10. Respective ones of ends of the refrigerant piping 15A and 15B are connected to a heat exchanger 16.

At the exterior unit 14, the other end of the refrigerant piping 15A is connected to a valve 18. The valve 18 is connected to a four way type valve 22 via a muffler 20A. Both sides of a conduit, to which an accumulator 24, a compressor 26 and a muffler 20B are connected, are connected to the four way type valve 22. Further, one end of the heat exchanger 28 is connected to the four way type valve 22. One end of the refrigerant piping 15B is connected to the other end of the heat exchanger 28 by a capillary tube 30, a strainer 32, and a valve 34. Further, the path between the muffler 20B and the four way type valve 22 and the path between the heat exchanger 28 and the capillary tube 30 are connected via an electromagnetic valve 36.

In this way, a closed refrigerant circulation path, i.e., a refrigerating cycle, is formed between the interior unit 12 and the exterior unit 14. By switching the four way type valve 22 and opening and closing the electromagnetic valve 36, the operation mode can be switched to a cooling mode, a heating mode or a dehumidify(dry) mode. FIG. 2 illustrates the flow of the refrigerant in the respective operation modes.

Figure 3:
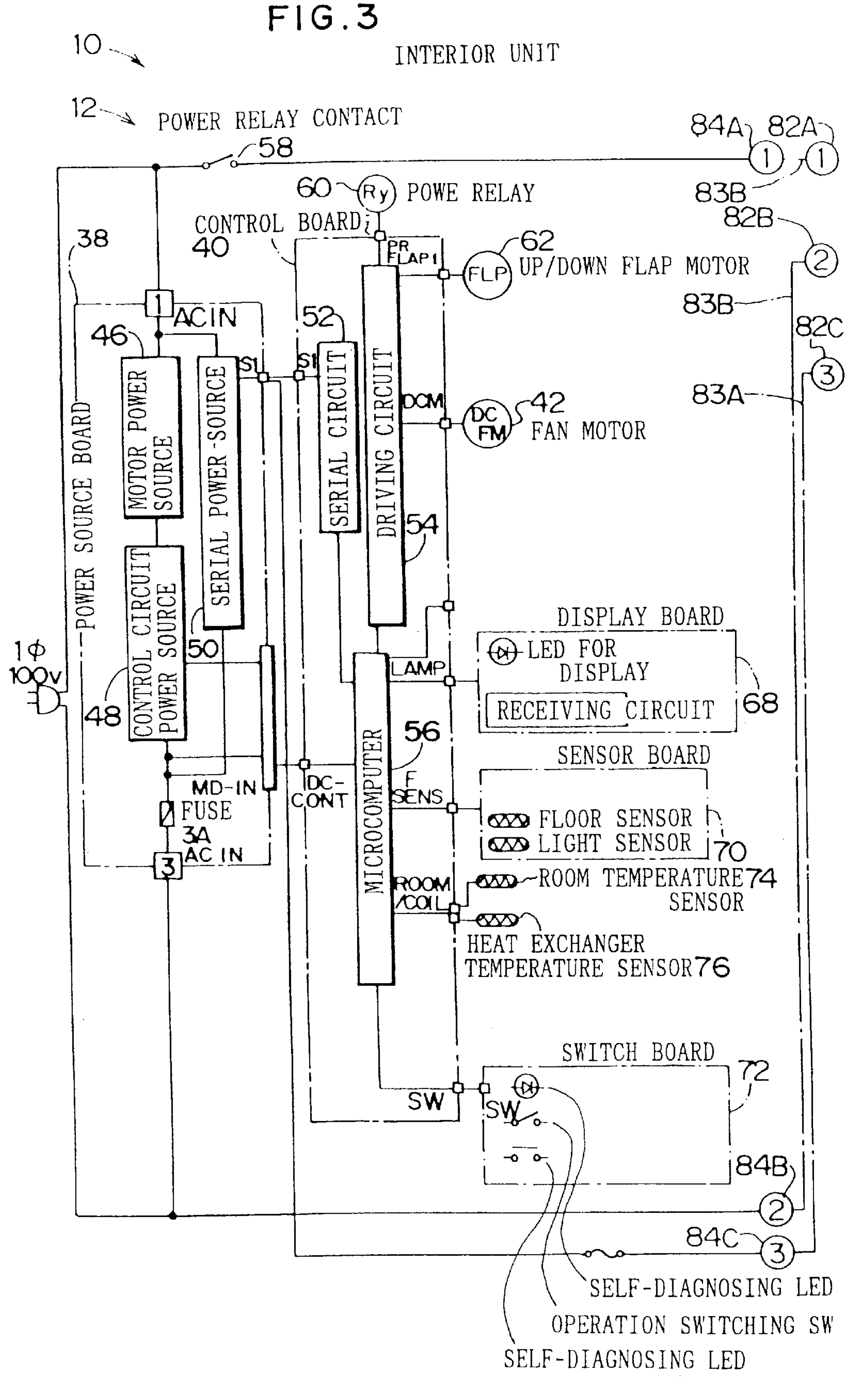
FIG. 3 is a schematic structural view of an electrical circuit of an interior unit of the first embodiment.
Figure 4:
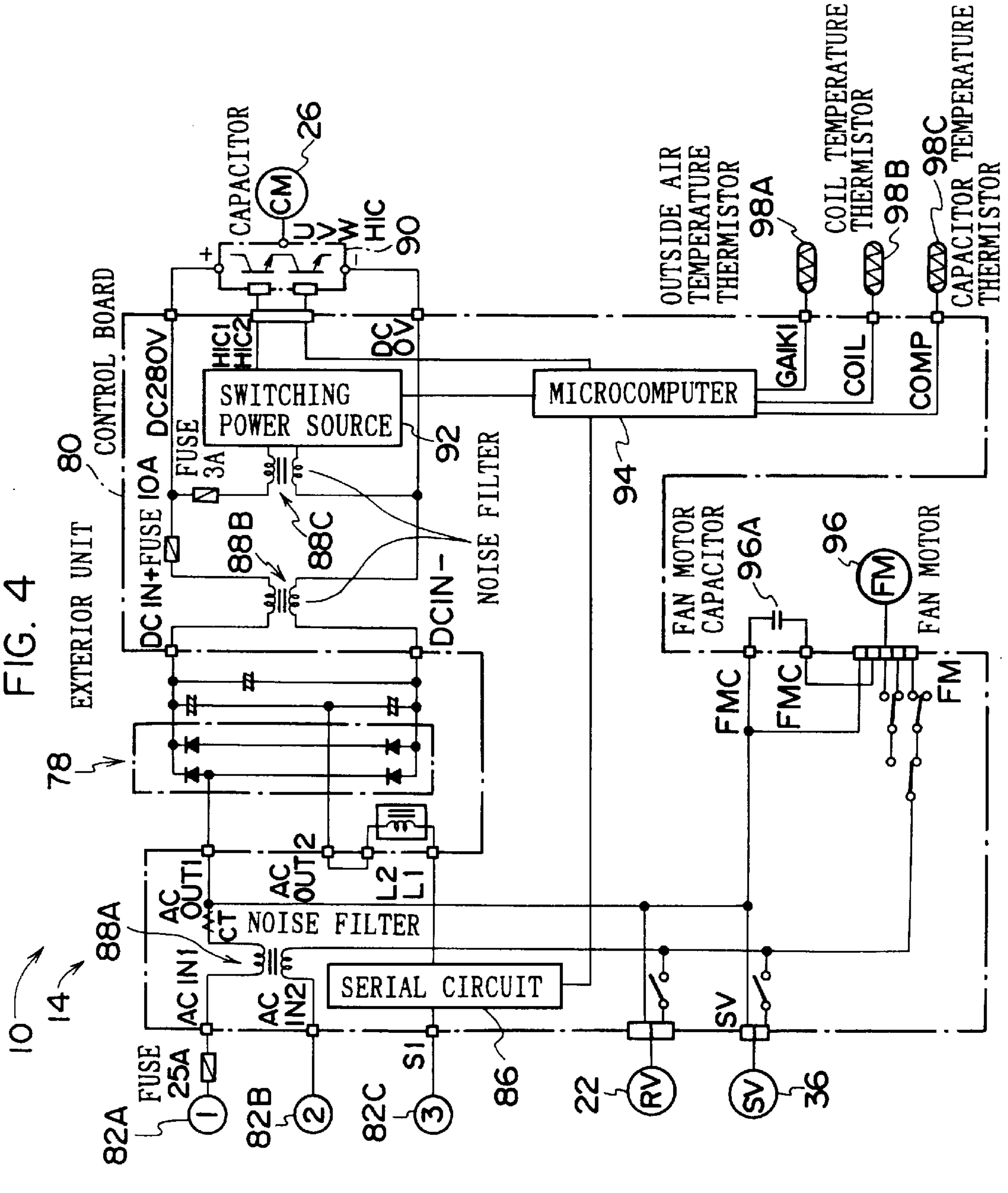
FIG. 4 is a schematic structural view of an electrical circuit of an exterior unit of the first embodiment.

FIG. 3 illustrates the schematic structure of an electrical circuit within the interior unit 12. FIG. 4 illustrates the schematic structure of an electrical circuit within the exterior unit 14.

As illustrated in FIG. 3, a power source board 38 and a control board 40 are provided in the interior unit 12. Alternating current power for operating the air conditioner 10 is supplied to the power source board 38. A motor power source 46 which outputs power for driving the respective motors within the interior unit 12, a control circuit power source 48 which outputs power for a control circuit, and a serial circuit power source 50 which outputs power for a serial circuit are provided at the power source substrate 38.

The control board 40 includes a serial circuit 52, a drive circuit 54 for driving the respective motors, and a microcomputer 56 to which the serial circuit 52 and the drive circuit 54 are connected and which controls operation of the air conditioner 10. A fan motor 42 (a DC brushless motor), a power relay 60, and an flap motor 62 are connected to the drive circuit 54. The fan motor 42 drives a cross flow fan (unillustrated) which blows out air-conditioned air toward the interior. The power relay 60 opens and closes a contact 58 of a power source circuit to the exterior unit 14. The flap motor 62 adjusts the air direction.

The drive circuit 54 changes, in accordance with signals from the microcomputer 56, the dc voltage supplied from the motor power source so as to adjust the rotational speed of the fan motor 42, i.e., the amount of air blown out from the interior unit 12 by the cross flow fan. For example, by changing the voltage supplied to the fan motor 42 within a range of 12 V to 36 V in 256 steps, the amount of blown air can be finely adjusted. At this time, the microcomputer 56 controls the flap motor 62 as needed so that the air direction is controlled together with the air amount from the interior unit 12.

A display board 68, a sensor board 70, a switch board 72, a room temperature sensor 74, and a heat exchanger temperature sensor 76 are connected to the microcomputer 56. The display board 68 displays the operating state and the operation mode of the air conditioner 10 and is provided with a transmitting/receiving circuit for communication with the remote control switch 44. The sensor board 70 is provided with floor sensors and light sensors. The switch board 72 is provided with LEDs for self-diagnosing and operation switching switches. The room temperature sensor 74 detects the room temperature. The heat exchanger temperature sensor 76 detects the temperature of the heat exchanger 16.

As illustrated in FIG. 4, a rectifier circuit 78 and a control board 80 are provided at the outside unit 14. Terminals 82A through 82C are connected to terminals 84A through 84C of the interior unit 12 (see FIG. 3), respectively, by a communication line 83A and a power source line 83B (see FIG. 1). The terminals 82A through 82C receive a supply of power and transmit and receive serial signals, which correspond to control. signals from the microcomputer 56, to and from the interior unit 12. In this way, control of the frequency of the ac power supplied to the compressor 26 is controlled (between, for example, 18 Hz and 150 Hz), and the operations of the respective devices are controlled.

A serial circuit 86 is provided at the control board 80 so that transmission and receipt of serial signals is carried out between the serial circuit 86 and the serial circuit 52 of the interior unit 12. Further, a plurality of noise filters 88A, 88B, 88C which eliminate noise, a switching power source 92 which supplies power to an inverter circuit 90 which drives the compressor 26, and a microcomputer 94 are provided at the control board 80.

In the air conditioner 10, by varying the frequency which is outputted from the inverter circuit 90 and drives the compressor 26, the rotational speed of the compressor 26 is varied, and the cooling and heating capability is adjusted.

The four way type valve 22 and the electromagnetic valve 36 within the exterior unit 14 are connected to the control board 80. The switching of the operation mode is carried out by switching the four way type valve 22 and by opening and closing the electromagnetic valve 36. Further, a fan motor 96 and a fan motor capacitor 96A of the heat exchanger 28 are connected to the control board 80. An outside air temperature thermistor 98A which detects the temperature of the outside air, a coil temperature thermistor 98B which detects the temperature of the heat exchanger 28, and a compressor thermistor 98C which detects the temperature of the compressor 26 are connected to the microcomputer 94 of the control board 80. The compressor 26 is driven while the operation of the fan motor 96, the operation state of the compressor 26, and the temperature of the outside air are detected.

Figure 15A:
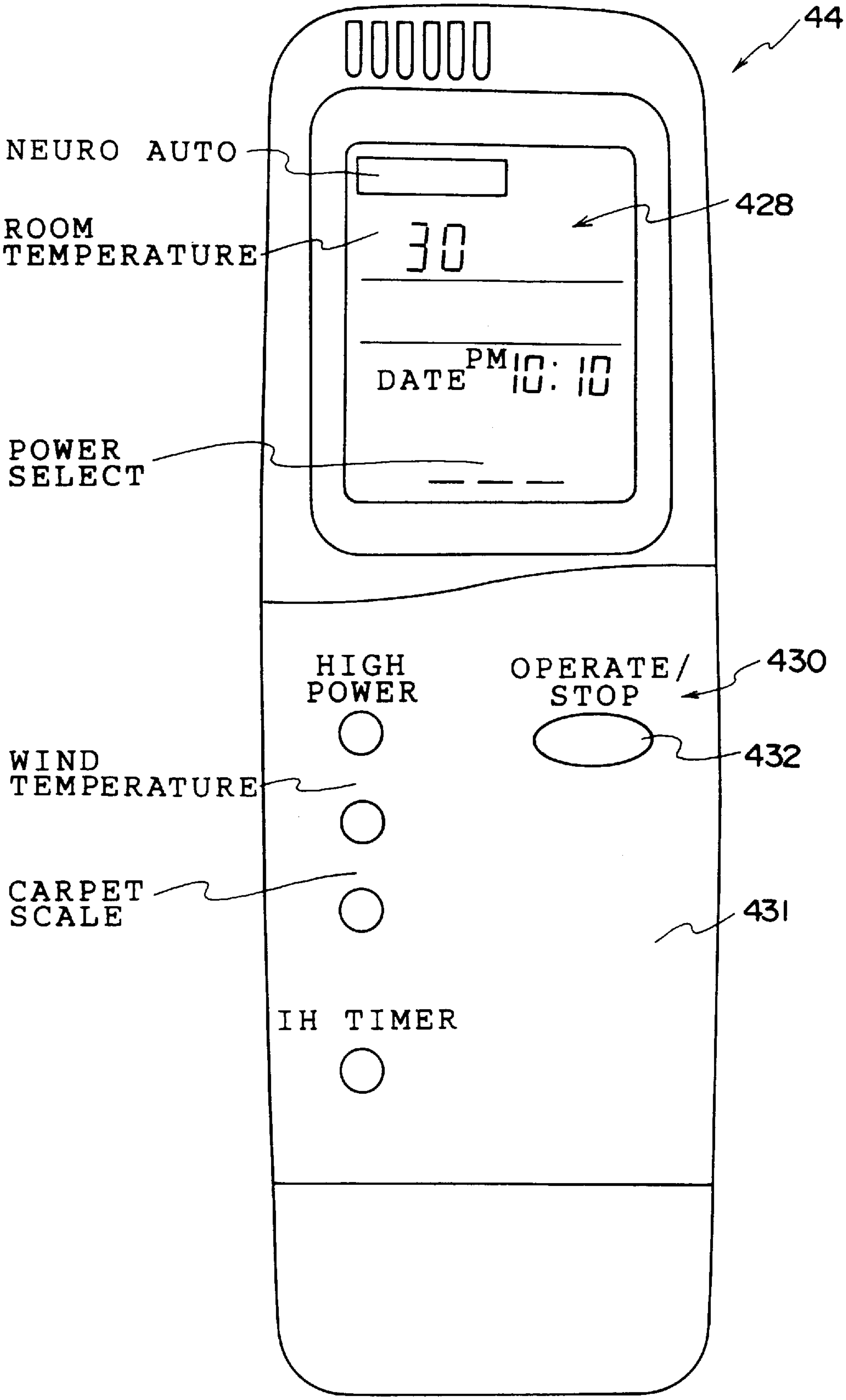
FIG. 15A is an schematic external view of a remote control switch.

As illustrated in FIG. 15A, a transmission section, a room temperature sensor and the like are provided within the remote control switch 44 which operates the air conditioner 10. A display section 428 which displays the operation state of the air conditioner and a switch section 430 for operation are provided on the surface of the remote control switch 44. At the switch section 430, an operate/stop button 432 and various operation switches for carrying out simple operations are provided on the surface of an open/close cover 431.

Figure 15B:
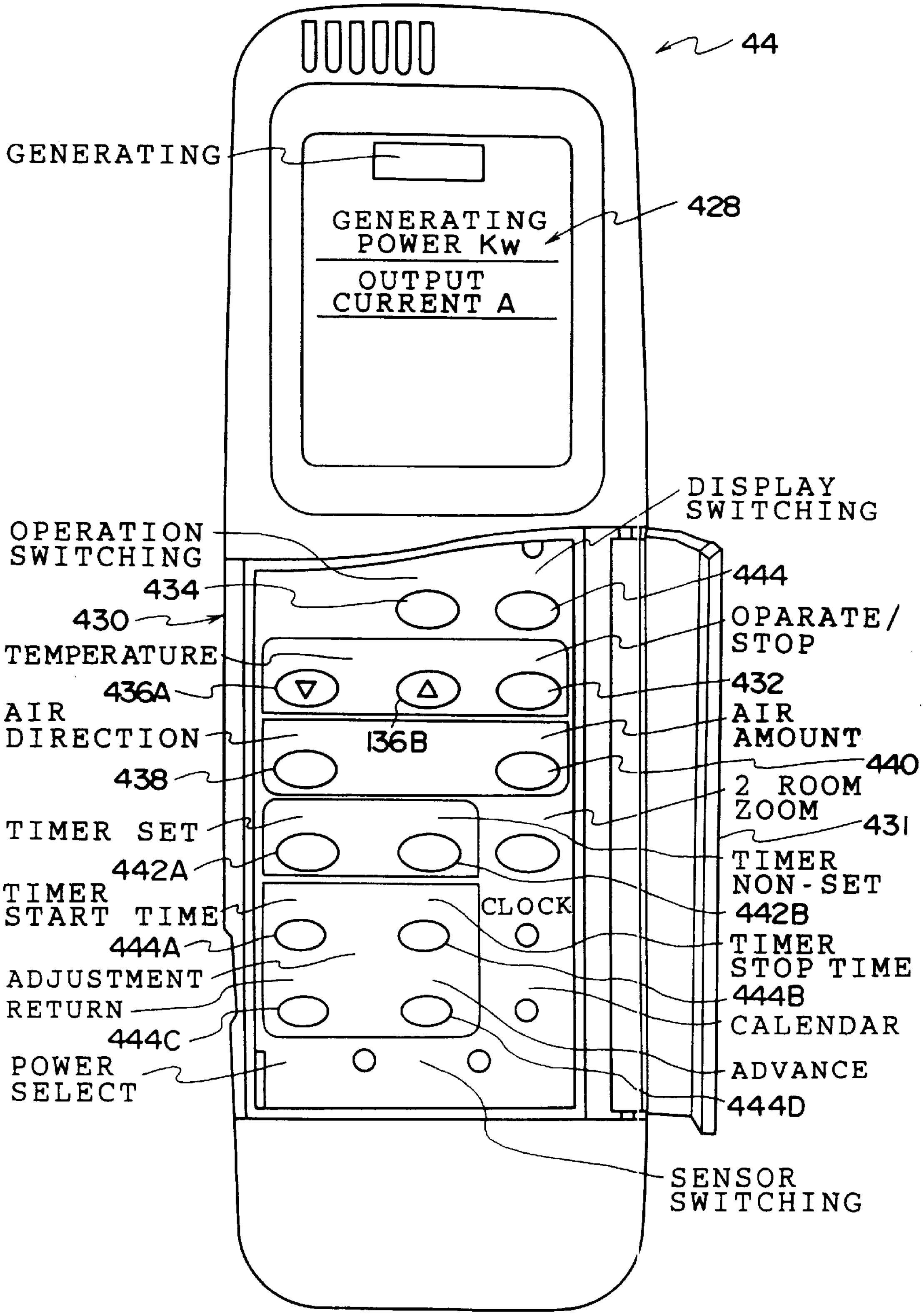
FIG. 15B is a schematic external view of the remote control switch in a state in which an open/close cover is open.

As shown in FIG. 15B, the switch section 430 of the remote control switch 44 includes various button switches which are exposed when the open/close cover 431 is opened. These button switches include the operate/stop button 432, an operation switching button 434, temperature buttons 436A, 436B for setting the temperature, air direction button 438 for adjusting the air direction, air amount button 440 for adjusting the air amount, timer buttons 442A, 442B for switching the timer between a set state and a non-set state, timer start time button 444A and timer stop time button 444B for setting the timer, time set buttons 444C, 444D, and the like. These buttons allow detailed setting of the operations of the air conditioner 10. Further, a display switching button 446, for displaying on the display section 428 the operating state of the SOL 100 which will be described later, is provided at the switch section 430.

Figure 5:
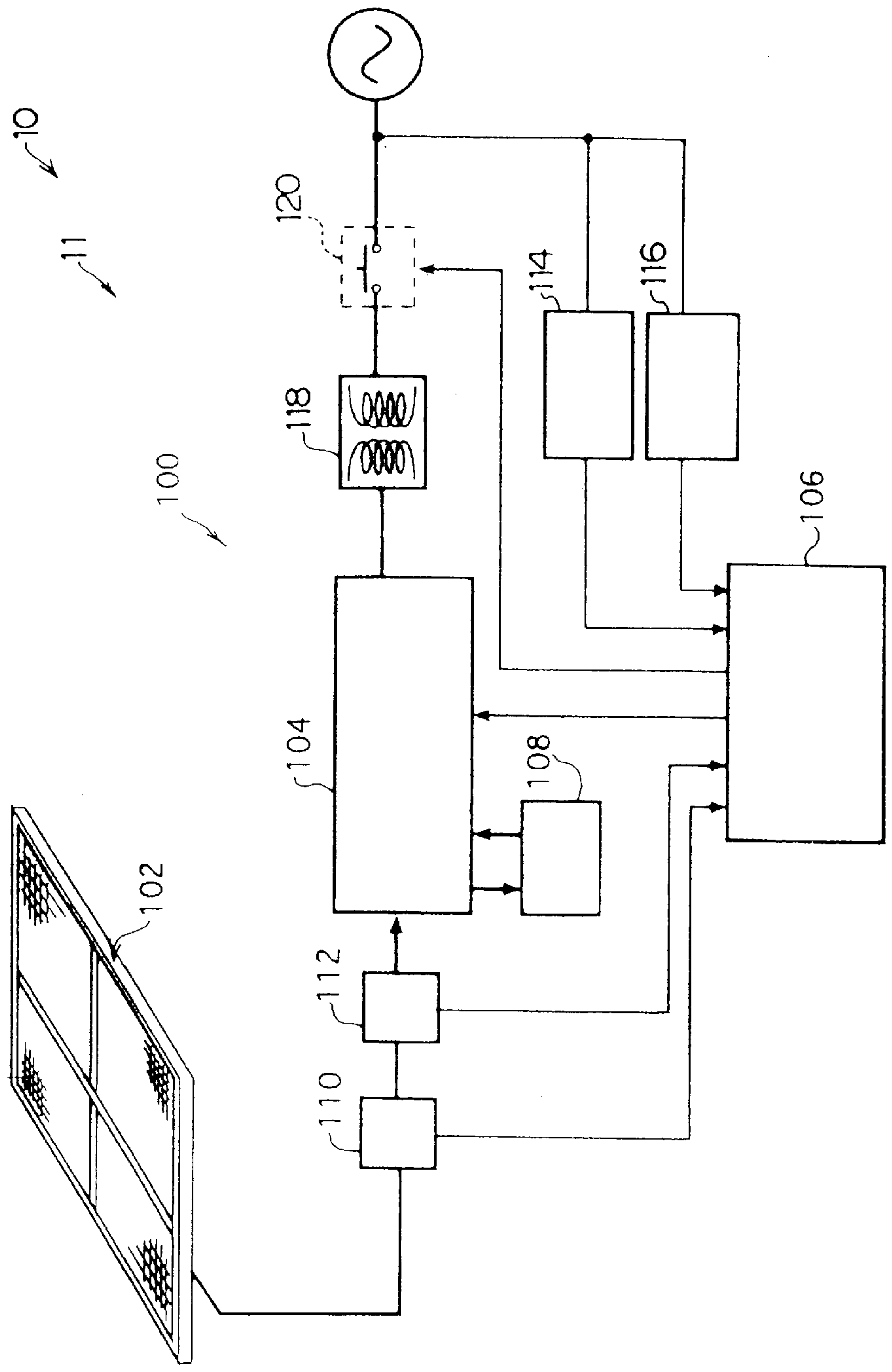
FIG. 5 is a block view illustrating a schematic structure of a commercial power source supplying unit (SOL) to which a solar cell is connected.

As illustrated in FIG. 5, the interior of the SOL 100 of the solar generator 11 is structured by an inverter circuit 104 and a microcomputer 106. The power generated by the solar cell 102 is supplied to the inverter circuit 104. The SOL 100 is provided with a generated current detecting section 110 and a generated voltage detecting section 112, for detecting the power generating state of the solar cell 102, and with a network interruption detecting section 114 and a network power detecting section 116, for judging the series connection with the commercial power source. Electric power for operation is supplied from the switching power source 108 to the generated current detecting section 110, the generated voltage detecting section 112, the network interruption detecting section 114, and the network power detecting section 116.

In the solar cell 102 which absorbs sunlight, a plurality of modules are set in a frame, and the solar cell 102 is set in a place which is illuminated by sunlight such as the roof of a building or the like. The generated power obtained by the conversion of sunlight at the solar cell 102 is supplied to the inverter circuit 104. More specifically, in the solar cell 102, dc power of a predetermined voltage is generated by the plurality of modules, and this dc power is supplied to the inverter circuit 104.

The inverter circuit 104 functions to convert the dc power to ac (the output of the inverter circuit 104 is, for example, a sawtooth-shaped wave) of the same frequency as the commercial power source (e.g., 50 Hz or 60 Hz) in accordance with the switching signal supplied from the microcomputer 106. The power converted to ac by the inverter circuit 104 is supplied to the commercial power source via a transformer 118. At this time, the dc component of the signal outputted from the inverter circuit 104 is eliminated by passing through the transformer 118.

Further, a parallel off conductor 120 is provided at the connection point of the transformer 118 and the commercial power source. When there is some type of abnormality in the solar generator 11 or the commercial power source, the SOL 100 and the commercial power source are disconnected by the parallel off conductor 120.

A summary of the operation of the inverter circuit 104 will now be given with reference to FIGS. 6 through 9.

The microcomputer 106 generates a switching signal for obtaining a quasi-sinewave signal on the basis of PWM theory. The switching signal generated by the microcomputer 106 is outputted to the inverter circuit 104.

Figure 6:
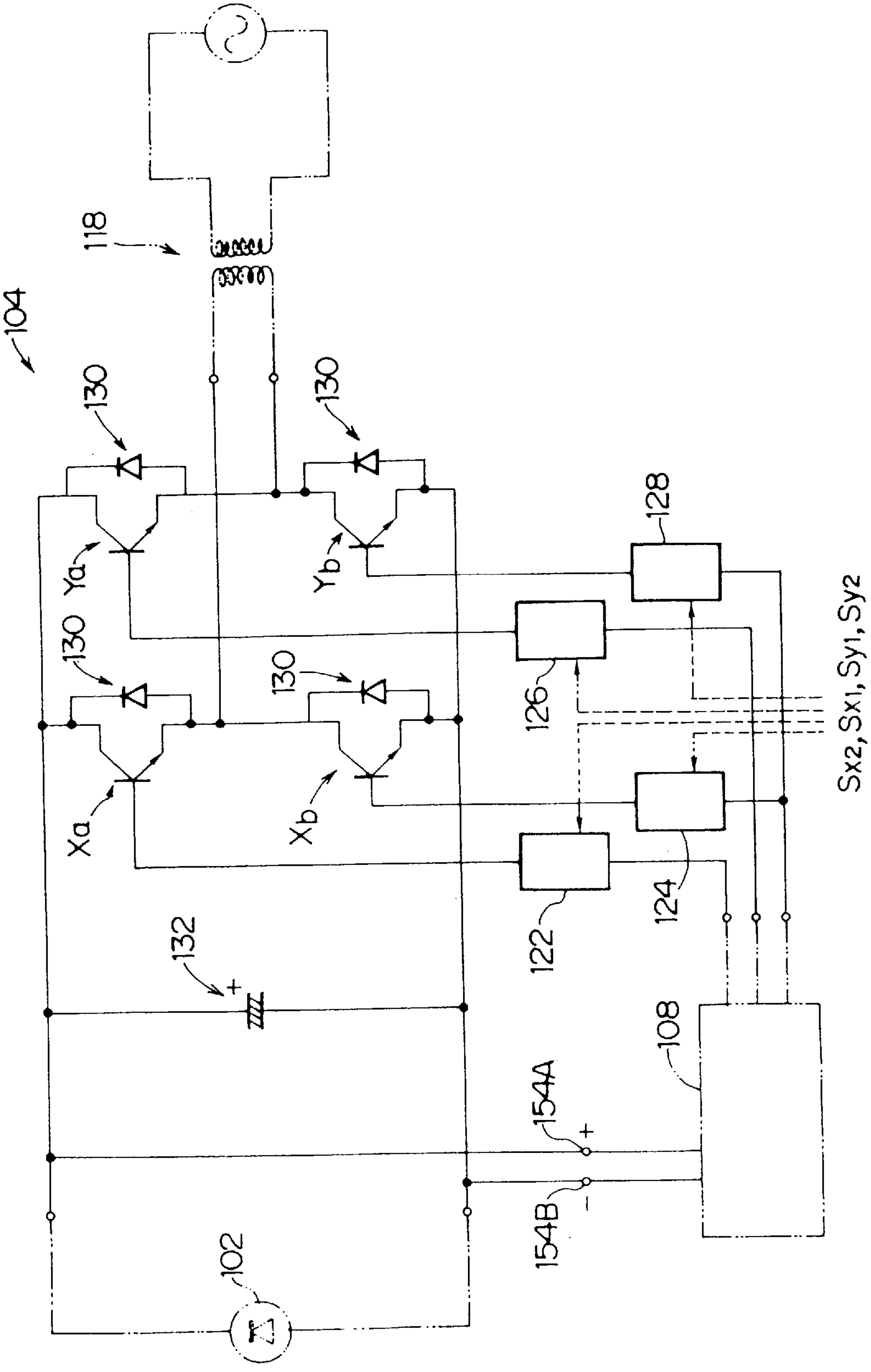
FIG. 6 is a circuit diagram summarily illustrating an inverter circuit.

As illustrated in FIG. 6, four switching elements X*a*, X*b*, Y*a*, Y*b* and switching amplifiers 122, 124, 126, 128 for driving the switching elements X*a*, X*b*, Y*a*, Y*b* respectively are provided at the inverter circuit 104. Power transistors, power FETs, IGBTs or the like can be used for the four switching elements X*a* through Y*b*. The switching elements X*a* through Y*b* connect the solar cell 102 and the ac power source in a bridge-like manner. Further, flywheel diodes 130 (hereinafter, "diodes 130") are connected in parallel to the respective switching elements X*a*, X*b*, Y*a*, Y*b*. When the switching elements X*a* through Y*b* are in non-operating states, the diodes 130 are connected in a bridge-like manner.

Switching signals generated by the microcomputer 106 are inputted to the respective switching amplifiers 122 through 128. The power from the switching power source 108 is supplied to the switching amplifiers 122 through 128, and is supplied to the switching elements X*a* through Y*b* in accordance with the switching signals. In this way, a so-called three power source method is used to drive the respective switching elements X*a* through Y*b*.

Accordingly, at the inverter circuit 104, a single phase quasi-sinewave, which corresponds to the power inputted from the solar cell 102 (e.g., 200 V of direct current), is outputted due to the respective switching elements X*a* through Y*b* being driven in accordance with predetermined switching signals. The dc component is removed from the single phase quasi-sinewave by passing through the transformer 118, and the quasi-sinewave is then supplied to the commercial power source.

A smoothing capacitor 132 is provided at the inverter circuit 104. Both ends of the smoothing capacitor 132 are connected to the switching power source 108. The power generated by the solar cell 102 is supplied to the switching power source 108. Further, when the generation of power by the solar cell 102 stops, the ac power of the commercial power source is rectified by the diodes 130 connected in parallel to the switching elements X*a* through Y*b*, is smoothed by the smoothing capacitor 132, and is supplied to the switching power source 108. In this way, a so-called two power source method for both alternating current and direct current is used.

Figure 7:
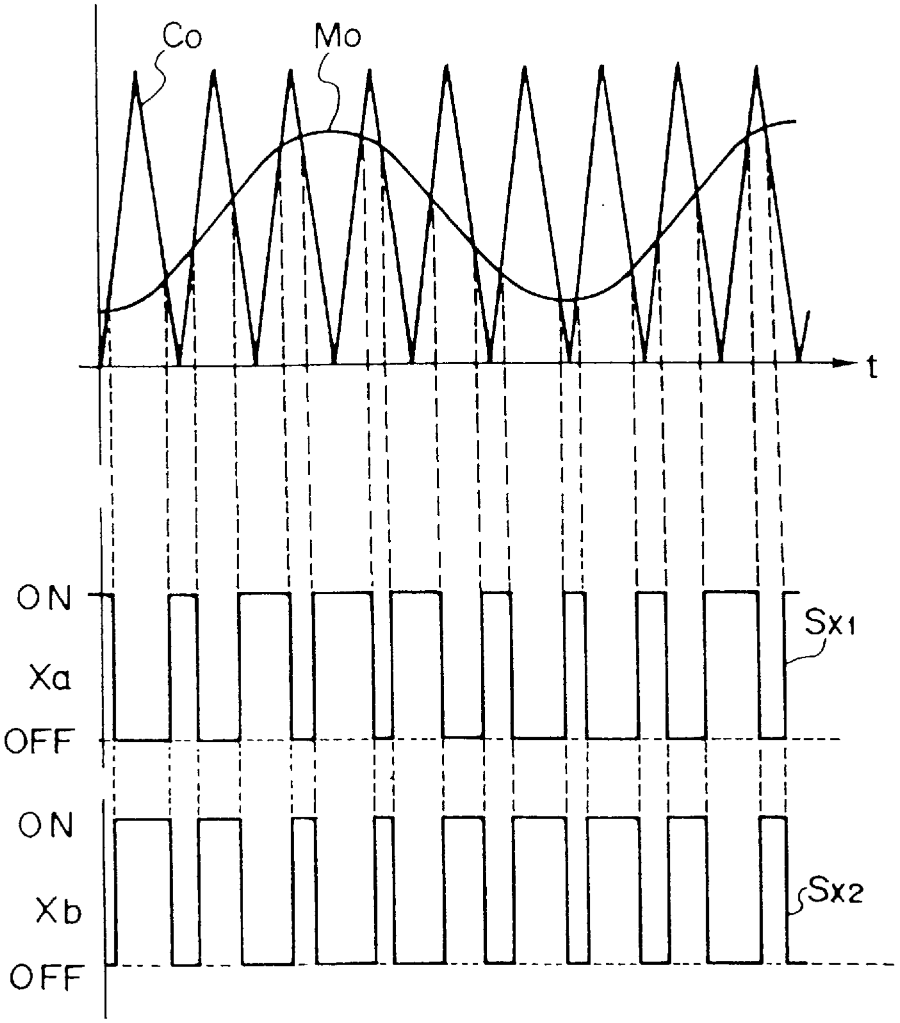
FIG. 7 is a diagram illustrating an example of outputs of switching signals from a modulation wave with respect to a carrier wave.
Figures 8A, 8B, 8C, 8D:
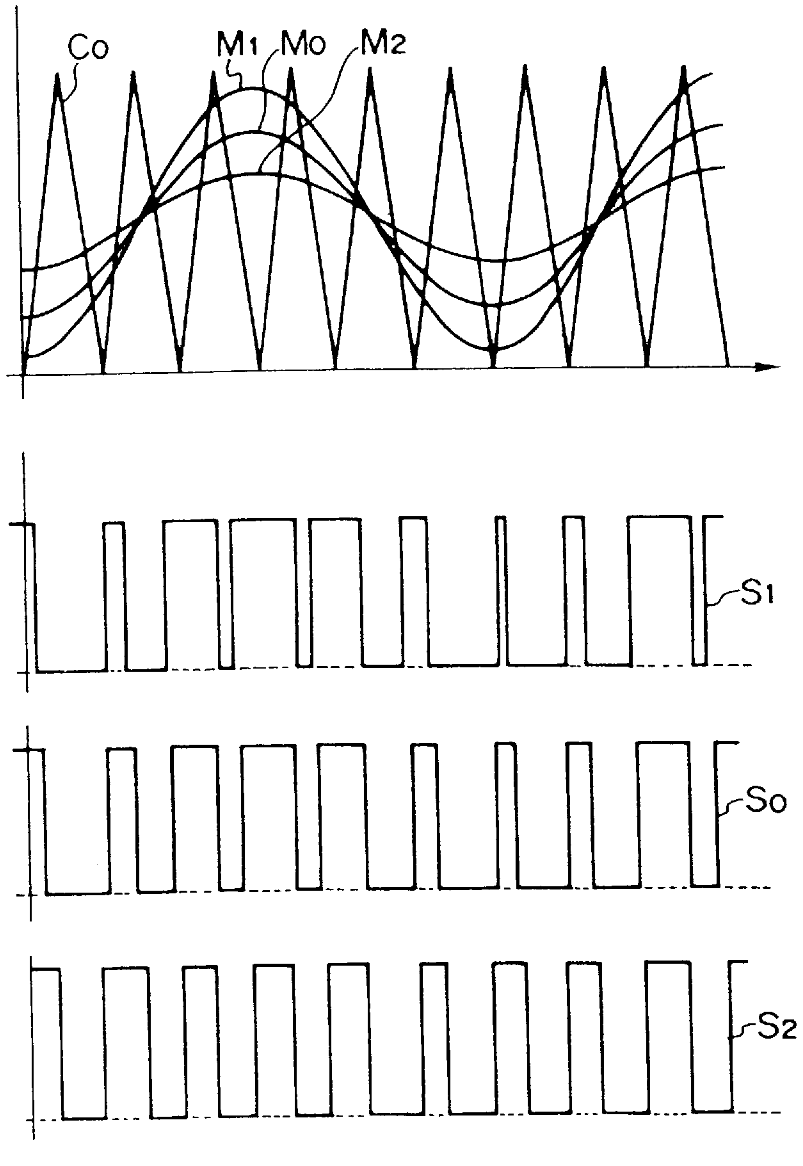
FIG. 8A is a diagram illustrating an example in which the amplitude of a modulation wave is varied.
FIG. 8B is a diagram illustrating an example of variation in a switching signal at the time the amplitude of a modulation wave is varied.
FIG. 8C is a diagram illustrating an example of variation in a switching signal at the time the amplitude of a modulation wave is varied.
FIG. 8D is a diagram illustrating an example of variation in a switching signal at the time the amplitude of a modulation wave is varied.

FIG. 7 illustrates the fundamentals at the time the microcomputer 106 generates a switching signal, by illustrating switching signals (ON/OFF signals) $Sx_1$, $Sx_2$ of the switching elements X*a*, X*b* as examples. The switching signal $Sx_2$ of the switching element X*b* is the inversion of the switching signal $Sx_1$ of the switching element X*a*. More specifically, the switching signal $Sx_1$ of the switching element X*a* is a signal which is turned on when a modulation wave $M_0$>a carrier wave $C_0$, wherein the modulation wave $M_0$ is, for example, a sinewave, a stepped sinewave or the like, and the carrier wave $C_0$ is, for example, a triangular wave, a stepped triangular wave, a sinewave, or the like. The switching signal $Sx_2$ of the switching element X*b* is turned on when the modulation wave $M_0$<the carrier wave $C_0$. Note that this is merely an example, and the present embodiment is not limited to this structure.

When the phase angle of the modulation wave $M_0$ advances by 180 degrees, and the modulation wave $M_0$>the carrier wave $C_0$, the switching signal $Sy_1$ (ON/OFF signal) of the switching element Y*a* is turned on. More specifically, the switching signal $Sy_1$ of the switching element Y*a* is a signal which is turned ON/OFF at the same timing as the switching signal $Sx_2$. Further, the switching signal $Sy_2$ of the switching element Y*b* is turned ON/OFF at the same timing as the switching signal $Sx_1$.

By using the switching signals $Sx_1$ through $Sy_2$, a quasi-sinewave in which the phase of the output of switching elements X*a*, X*b* and the phase of the output of switching elements Y*a*, Y*b* are offset by 180 degrees can be generated.

The period of the modulation wave $M_0$ is the same as the frequency f outputted from the inverter circuit 104, i.e., the frequency of the commercial power source (50 Hz or 60 Hz). By changing the period of the modulation wave $M_0$, the frequency f of the quasi-sinewave outputted by the inverter circuit 104 can be changed. Further, if the period of the carrier wave $C_0$ is shortened, it is preferable that the number of times of ON/OFF in one period of the quasi-sinewave increases and the resolution of the quasi-sinewave increases.

FIGS. 8A through 8D illustrate switching signals $Sx_1$ (FIG. 8B), $Sx_0$ (FIG. 8C), $Sx_2$ (FIG. 8D) for the modulation wave $M_0$ and modulation waves $M_1$, $M_2$ (FIG. 8A) whose amplitudes have been modulation with respect to the modulation wave $M_0$. The respective switching signals $Sx_0$ through $Sx_2$ are signals which are ON when the modulation wave M>carrier wave $C_0$.

In this way, at the modulation wave $M_1$ whose amplitude is greater than that of modulation wave $M_0$, the ON time and the OFF time of the switching signal $S_1$ are partly longer than the switching signal $S_0$ for the modulation wave $M_0$. The voltage of the quasi-sinewave $S_1$ (the voltage generated at both ends of the coil when voltage is applied to the transformer 118) thereby increases. Further, at modulation wave $M_2$ whose amplitude is less than that of modulation wave $M_0$, the ON times and OFF times which were partly longer respectively become shorter. The voltage of the quasi-sinewave $S_2$ can thereby be made low. More specifically, the voltage of the quasi-sinewave can be varied by changing the difference between the maximum ON time and the minimum ON time by changing the amplitudes of the modulation waves.

Figure 9:
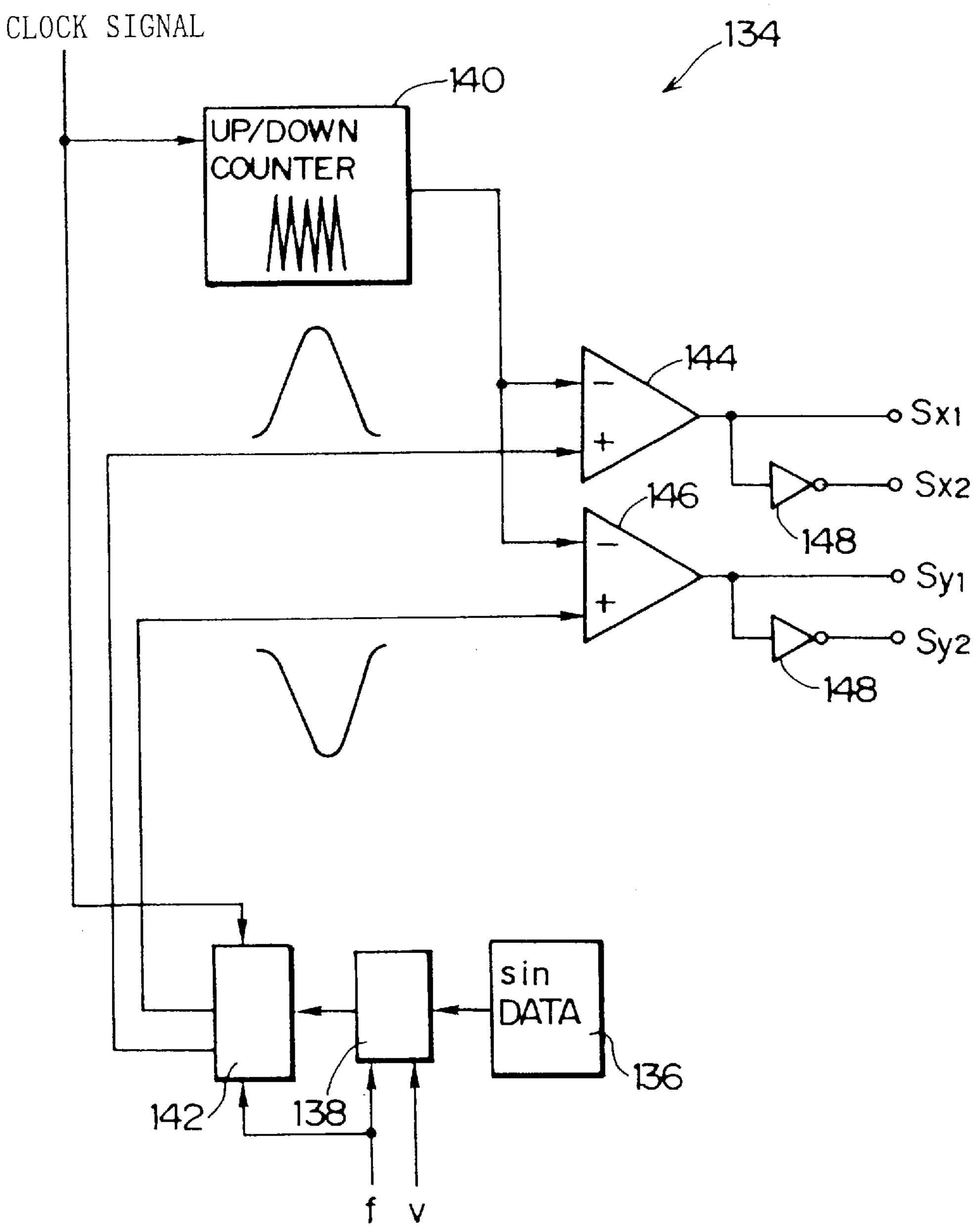
FIG. 9 is a function block diagram summarily illustrating a switching signal generating section.

FIG. 9 is a function block diagram illustrating a switching signal generating section 134 formed in the microcomputer 106. The switching signal generating section 134 includes a storage section 136 which stores sine data for forming the sinewave, a sinewave control section 138, a 16-bit UP/DOWN counter 140, a distributor 142, comparators 144, 146, and inverters 148.

The UP/DOWN counter 140 adds count values synchronously with inputted clock signals. When the count value reaches FFFFH, the count value is subtracted. Then, when the count value reaches OH, addition begins again, and thereafter, adding of the count value and subtracting of the count value are repeated. The output of the UP/DOWN counter 140 thereby varies in a triangular wave shape and is outputted to the respective comparators 144, 146 as the carrier wave $C_0$.

The sinewave controller section 138 outputs a sinewave in accordance with the frequency f and voltage v (amplitude) data. This sinewave data is stored in the storage section 136 with, for example, the data being divided per cycle into OH through FFFFH. The sinewave control section 138 reads the sinewave data in order in accordance with the frequency f, and corrects and outputs the amplitude in accordance with the voltage v. The distributor 142 shifts by 180 degrees the phase angle of the sinewave outputted from the sinewave control section 138, and outputs the sinewave to the respective comparators 144, 146 as the modulation wave $M_0$.

The comparators 144, 146 compare the carrier wave (triangular wave) $C_0$ and the modulation wave $M_0$ (the sinewave of frequency f) inputted thereto, and output ON/OFF signals as the switching signals $Sx_1$, $Sy_1$ in accordance with the results of comparison. The respective inverters 148 invert the outputs of the comparators 144, 146, and output the inverted signals as the switching signals $Sx_2$, $Sy_2$.

A delay circuit (a circuit which delays for a predetermined time the changing of a signal from OFF to ON) may be included in the circuit (e.g., the switching amplifiers 122 through 128) for supplying the switching signals $Sx_1$ through $Sy_2$ to the switching elements $X_a$ through $Y_b$, for times when the delay time in the ON/OFF of the switching elements X*a* through Y*b* due to the switching signals outputted as described above is great (especially the delay in ON→OFF). Further, the modulation waves $M_0$ and the carrier waves $C_0$ supplied to the comparators 144, 146 may be D/A converted and compared with an analog voltage level and outputted. Moreover, the above description illustrated an example of generating the switching signals $Sx_1$ through $Sy_2$. However, the present embodiment is not limited to the same, and switching signals generated by any of various structures can be used.

Figure 10:
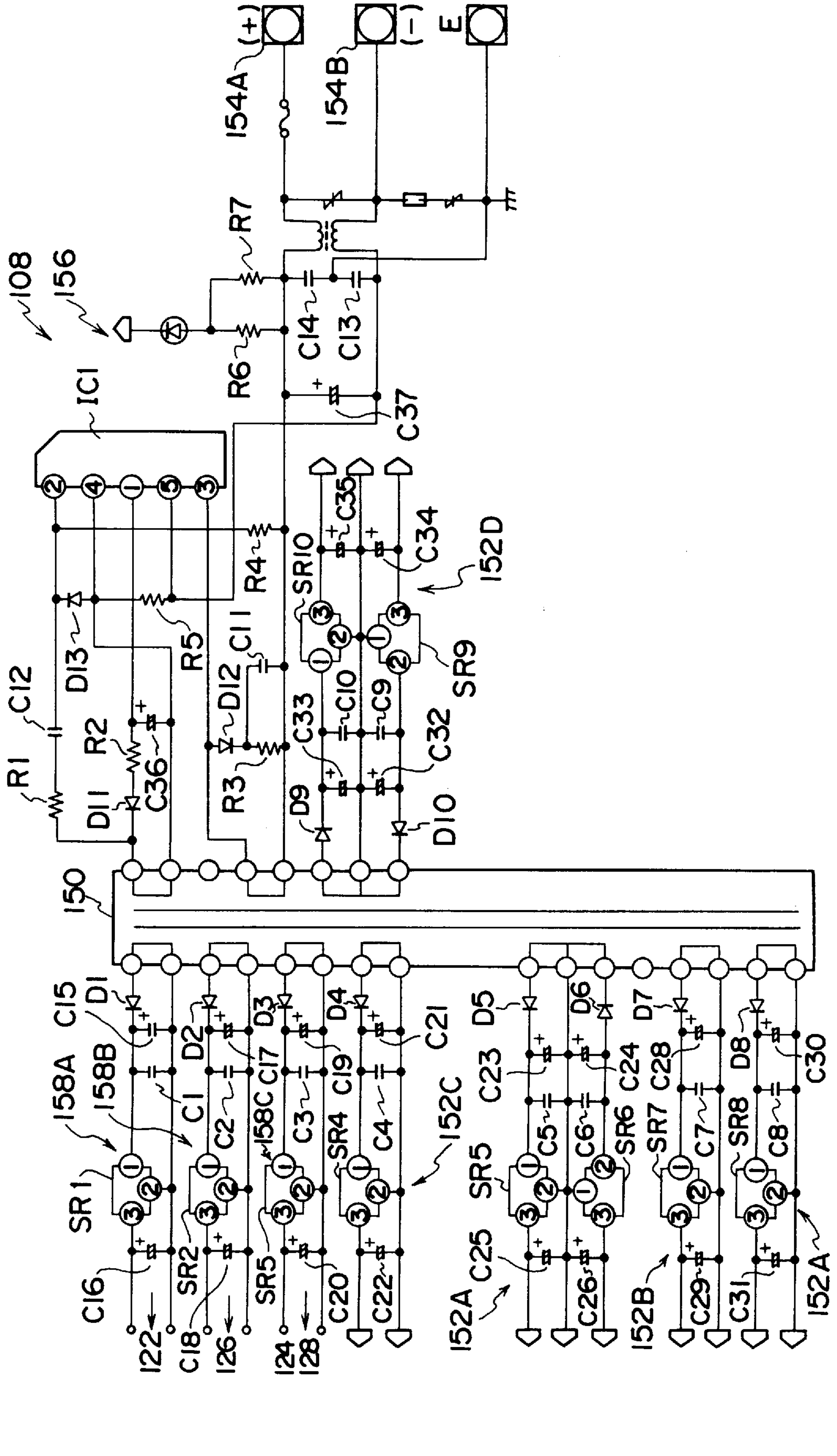
FIG. 10 is a circuit diagram summarily illustrating a switching power source.

FIG. 10 illustrates an example of the switching power source 108. Rectifier circuits are provided at a switching transformer 150 of the switching power source 108. The rectifier circuits are formed by diodes D1 through D10, capacitors C1 through C10, smoothing capacitors C15 through C35, and three-terminal regulators SR1 through SR10, all of which are provided at the switching transformer 150. The outputs of rectifier circuits 152A through 152E are supplied to the microcomputer 106, the generated current detecting section 110, the generated voltage detecting section 112, the network interruption detecting section 114, and the network power detecting section 116.

In the switching power source 108, dc power is supplied between terminals 154A, 154B from the inverter circuit 104 (see FIG. 6). The dc power supplied from the inverter circuit 104 is converted to ac at an inverter circuit 156 and supplied to the switching transformer 150. At this time, as described previously, the inverter circuit 104 can supply dc power to the switching power source 108 even if the solar cell 102 is interrupted. In this way, even at times at which the generation of electricity at the solar cell 102 is stopped, such as at night or the like, the respective structural parts within the SOL 100 can be operated appropriately.

Rectifier circuits 158A, 158B, 158C are connected to the switching amplifiers 122 through 128 of the inverter circuit 104. Driving power is supplied from the rectifier circuits 158A through 158C to the switching elements X*a* through Y*b*. More specifically, as illustrated in FIG. 6, the driving power outputted from the rectifier circuits 158A, 158B of the switching power source 108 is supplied via the switching amplifiers 122, 126 to the switching elements X*a*, Y*a* for output of the high side of the single phase power. Further, driving power is supplied from the rectifier circuit 158C of the switching power source 108 via the switching amplifiers 124, 128 to the switching elements X*b*, Y*b* for output of the low side of the single phase power.

In this way, different driving electric powers from the rectifier circuits 158A through 158C are supplied to the respective switching elements X*a* through Y*b* which output single phase ac power (in this case, ac power of single phase 200 V). Therefore, even if the output of the switching elements X*a* through Y*b* becomes large, the burden on the respective rectifier circuits 158A through 158C is made small, and the respective switching elements X*a* through Y*b* can be operated safely. Note that the three-terminal regulators SR1 through SR10, resistors R1 through R7, the capacitors C1 through C14, the smoothing capacitors C15 through C37, the diodes D1 through D13, IC1 and the like which form the switching power source 108 illustrated in FIG. 10 are determined by the design.

In the network power detecting section 116, in order to have the voltages, frequencies and phases of the outputs of the commercial power source and the SOL 100 match, the timing at which the instantaneous value of the ac voltage of the commercial power source becomes "0" is detected (hereinafter, "zero cross detection"). Here, an example of zero cross detection at the network power detecting section 116 will be described with reference to FIGS. 11A through 11C.

Figure 11A:
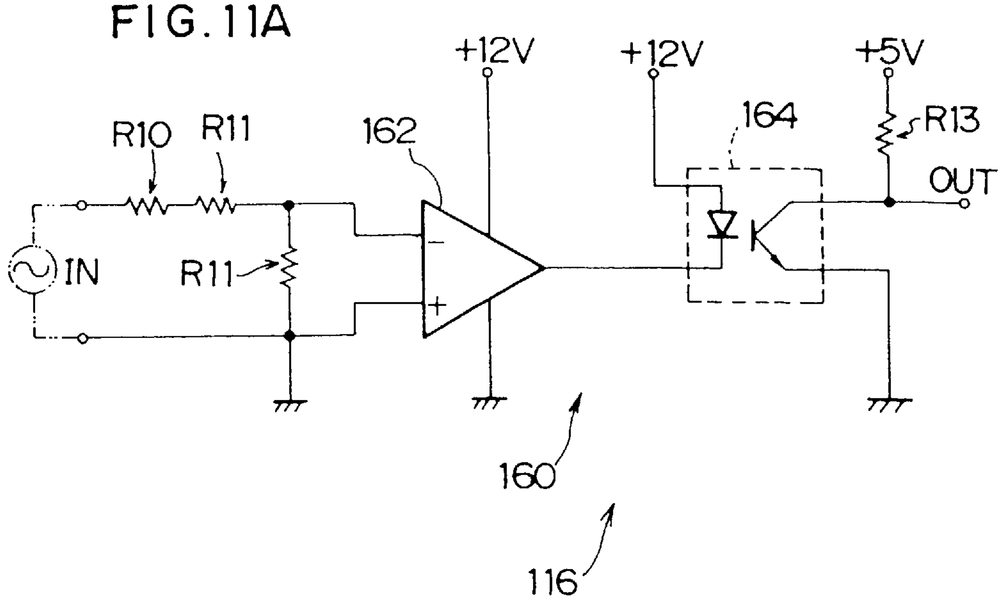
FIG. 11A is a circuit diagram summarily illustrating a zero cross detection circuit.

FIG. 11A illustrates a zero cross detecting circuit 160 which detects the point at which the instantaneous value of the ac voltage of the commercial power source becomes zero (zero cross point $P_0$). The zero cross detecting circuit 160 is a simple structure formed by a comparator 162, a photocoupler 164, and by resistors R10 through R13 which are determined by the design.

Figure 11B:
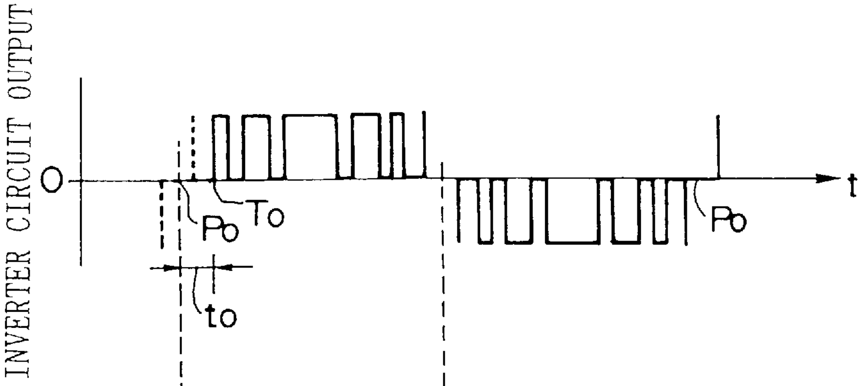
FIG. 11B is a diagram illustrating an example of output of an inverter circuit.
Figure 11C:
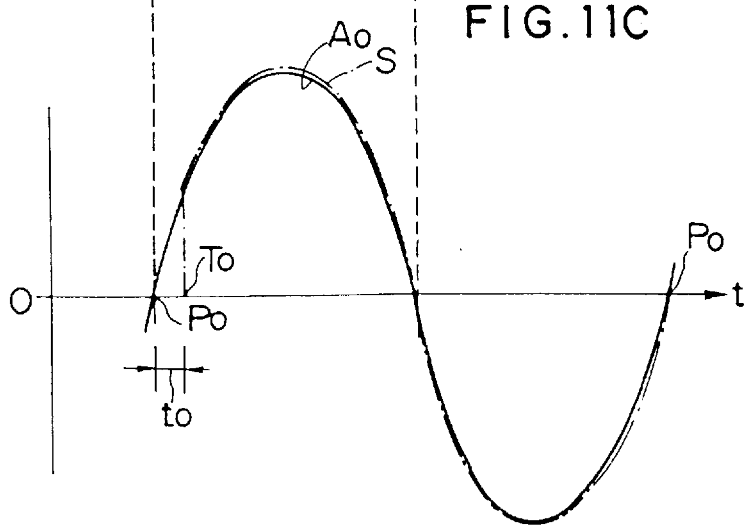
FIG. 11C is a diagram illustrating a waveform of a commercial power source and a waveform outputted from the SOL.

In the zero cross detecting circuit 160, the output of the comparator 162 is low level when an ac waveform $A_0$ inputted to the comparator 162 (e.g., a voltage waveform) is on the plus side (above the "0" level in FIG. 11C). The output of the comparator 162 is high level when the ac waveform $A_0$ is on the minus side (is below the "0" level in FIG. 11C).

As a result, the output of the photocoupler 164 is ON when the output of the comparator 162 switches from high level to low level, and is OFF when the output of the comparator 162 switches from low level to high level. In the microcomputer 106, the time at which the output of the zero cross detecting circuit 160 switches from OFF to ON is judged to be the zero cross point $P_0$ of the commercial power.

In the microcomputer 106, when the zero cross point $P_0$ of the commercial power is detected, the switching signals $Sx_1$ through $Sy_2$ are outputted to the inverter circuit 104 at the timing of the time $T_0$, while taking into consideration a delay $t_0$ (see FIG. 11C) caused by the time constants of the zero cross detecting circuit 160 and the circuits within the microcomputer 106 and the inverter circuit 104. At this time, the time $t_0$ is subtracted from the zero cross point $P_0$ (the broken line portion in the drawing is subtracted), and output starts at the time $T_0$. In this way, as illustrated in FIG. 11B, output from the inverter circuit 104 is delayed by the time $t_0$ from the zero cross point $P_0$ and is begun just as if it had started from the zero cross point $P_0$.

As illustrated in FIG. 11C, an output waveform S (voltage waveform) whose phase matches the ac waveform $A_0$ of the commercial power source can be outputted. Note that the output of the inverter circuit 104 shown in FIG. 11B is illustrated summarily, and that the pulse width and the like are different than in reality.

It is known that the level of the third-order harmonics of the circuit of the commercial power source increases when the commercial power source is interrupted. The level of the third-order harmonics of the commercial power source becomes the largest. Here, in the network interruption detecting section 114 of the SOL 100, the third-order harmonics of the commercial power source are detected and are outputted to the microcomputer 106. At the microcomputer 106, when the level of the third-order harmonics exceeds a predetermined value (a threshold value), it is determined that the commercial power source has been interrupted. The parallel off conductor 120 is operated, and the SOL 100 is disconnected from the commercial power source so that the parts within the SOL 100 are protected from, in particular, overloading of the switching elements X*a* through Y*b* of the inverter circuit 104.

Figure 12:
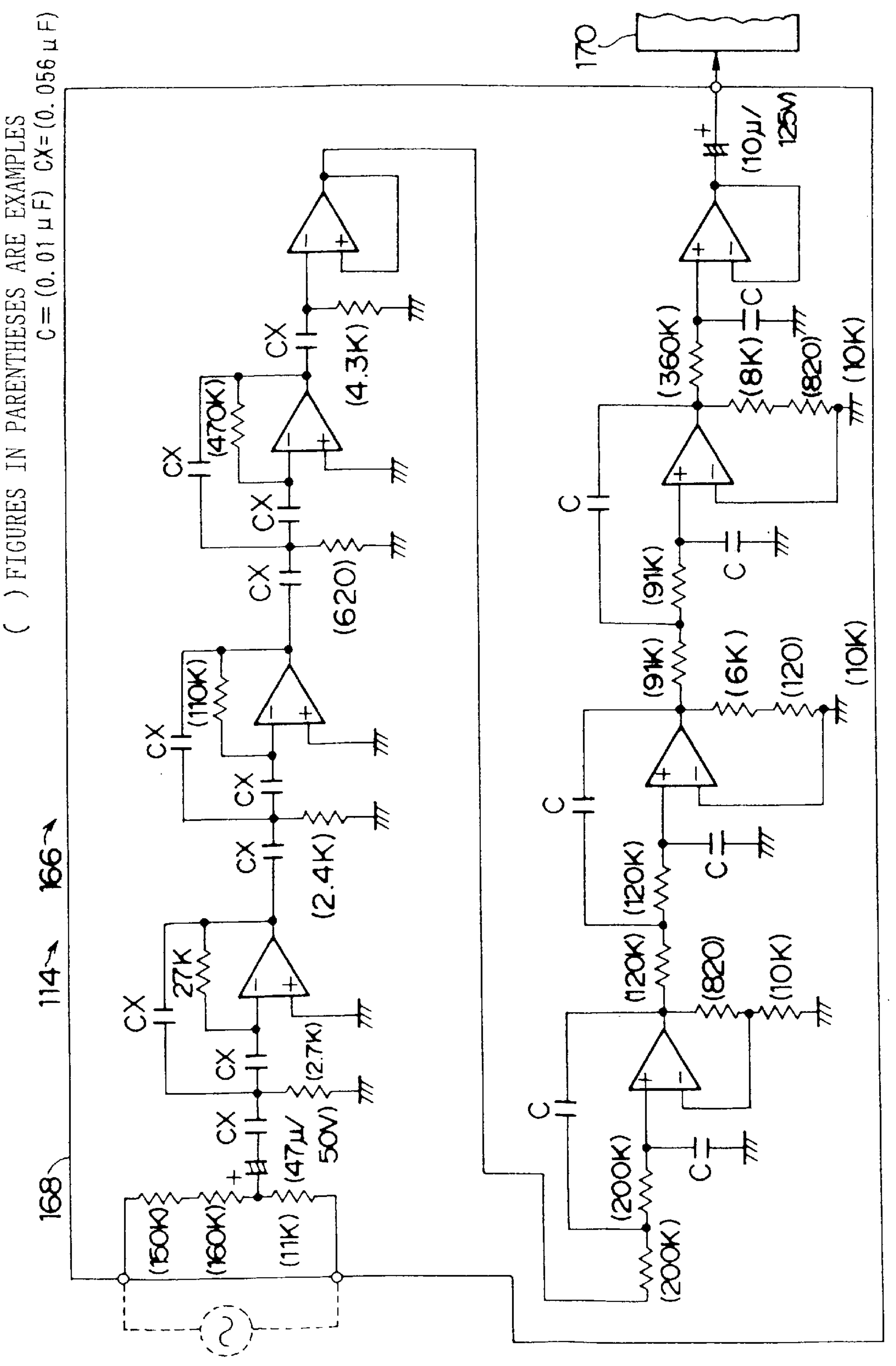
FIG. 12 is a circuit diagram summarily illustrating a filter circuit provided at a network interruption detecting circuit.
Figure 13:
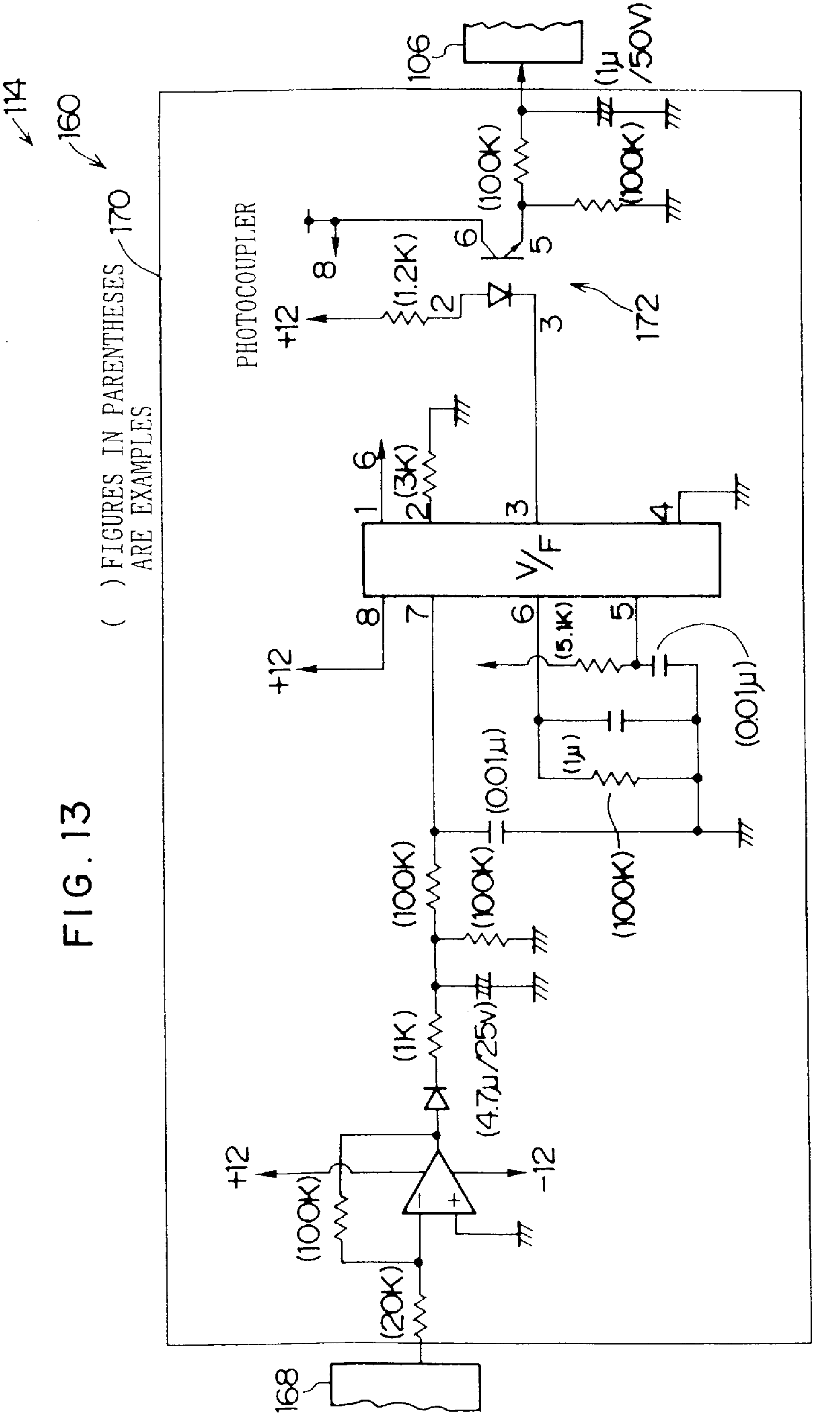
FIG. 13 is a circuit diagram summarily illustrating an interface circuit provided at the network interruption detecting circuit.

FIGS. 12 and 13 illustrate an example of third-order harmonics detecting circuit 166 provided at the network interruption detecting section 114.

At the third-order harmonic detecting circuit 166, a filter circuit 168 is formed by a plurality of low pass filters and high pass filters. Only frequencies of 140 to 180 Hz including the third-order harmonics (e.g., 150 Hz) of the commercial power source pass through the filter circuit 168. The output of the filter circuit 168 is supplied to an interface circuit 170 illustrated in FIG. 13. At the interface circuit 170, the output level (the level of the third-order harmonics) of the filter circuit 168 is detected, and an ON/OFF signal of a period corresponding to this level of the third-order harmonics is supplied to a photocoupler 172. The ON/OFF output of the photocoupler 172 is smoothed by a resistor and a capacitor, and thereafter, is supplied to the microcomputer 106 as output of the network interruption detecting section 114. At the microcomputer 106, on the basis of the output voltage level of the network interruption detecting section 114, it is judged whether the commercial power source has been interrupted.

The generated current detecting section 110 (the current transformer using a Hall element) and the generated voltage detecting section 112, which are provided between the solar cell 102 and the inverter circuit 104, detect the current and voltage, respectively, generated at the solar cell 102 and supplied to the inverter circuit 104. The generated current detecting section 110 and the generated voltage detecting section 112 output the detected current and voltage to the microcomputer 106.

From the results of detection of the generated current detecting section 110 and the generated voltage detecting section 112, the microcomputer 106 determines whether the solar cell 102 is in a power generating state and computes the generated power, and outputs to the inverter circuit 104 a switching signal such that a voltage which results in the generated power being a maximum is obtained. The voltage outputted from the inverter circuit 104 substantially corresponds to and is slightly higher than the voltage of the commercial power source.

Figure 14:
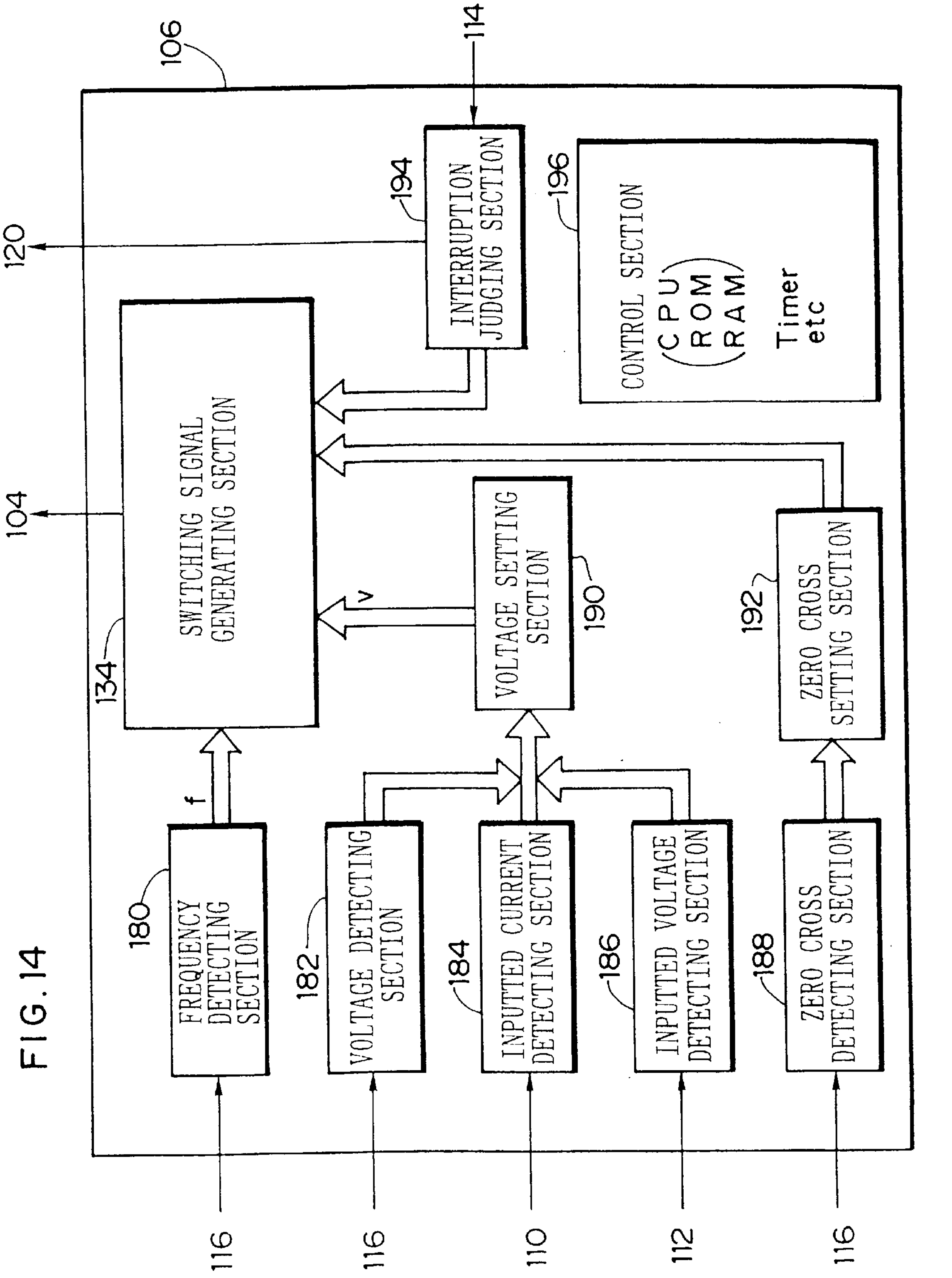
FIG. 14 is a function block diagram illustrating interior functions of a microcomputer.

As illustrated in FIG. 14, the interior of the microcomputer 106 comprises the switching signal generating section 134, a frequency detecting section 180, a voltage detecting section 182, an inputted current detecting section 184, an inputted voltage detecting section 186, a zero cross detecting section 188, a voltage setting section 190, a zero cross setting section 192, and an interruption judging section 194. The frequency detecting section 180 detects the frequency of the commercial power source and sets the frequency f outputted from the inverter circuit 104. The voltage detecting section 182 detects the voltage of the commercial power source. The inputted current detecting section 184 and the inputted voltage detecting section 186 detect the current and the voltage inputted from the solar cell 102. The zero cross detecting section 188 detects the zero cross point $P_0$ of the commercial power source. The voltage setting section 190 sets the voltage v outputted from the inverter circuit 104 on the basis of the results of detection of the voltage detecting section 182, the inputted current detecting section 184, and the inputted voltage detecting section 186. The zero cross setting section 192 sets the zero cross point of the waveform outputted from the inverter circuit 104 on the basis of the results of detection of the zero cross detecting section 188. The interruption judging section 194 judges whether the commercial power source has been interrupted. The switching signal generating section 134, the frequency detecting section 180, the voltage detecting section 182, the inputted current detecting section 184, the inputted voltage detecting section 186, the zero cross detecting section 188, the voltage setting section 190, the zero cross setting section 192, and the interruption judging section 194 are controlled by a control section formed by a CPU, a ROM, a RAM, a timer and the like.

In this way, the microcomputer 106 matches the frequency, voltage and phase of the power supplied to the commercial power source from the SOL 100. Further, the microcomputer 106 protects the SOL 100 when there is trouble with the commercial power source.

In the microcomputer 106, the input to the inverter circuit 104 and the output from the inverter circuit 104 are measured. When the frequency, current and voltage exceed respective predetermined ranges, the microcomputer 106 stops the inverter circuit 104 (i.e., stops the switching elements X*a* through Y*b* by blocking the gates).

A serial circuit (unillustrated) is provided within the microcomputer 106 of the SOL 100. A communication line 120 connected to the serial circuit is connected to the terminal 82C of the exterior unit 14. In this way, the microcomputer 106 is connected to the microcomputer 56 of the interior unit 12 via the communication lines 120, 82C. The power generating state of the solar cel 102 and operation information regarding the SOL 100 and the solar cell 102, such as the operating state of the SOL 100 and the like, are thereby outputted to the microcomputer 56 of the interior unit 12.

When the display switching button 446 is operated and the interior unit 12 receives from the remote control switch 44 an operation signal requesting information relating to the operation state of the SOL 100, the interior unit 12 transmits to the remote control switch 44 operation information sent from the microcomputer 106 of the SOL 100. More specifically, when the open/close cover 431 of the remote control switch 44 is opened and the display switching button 446 is operated, the remote control switch 44 requests operation information regarding the SOL 100 from the interior unit 12. When the remote control unit 44 receives operation information regarding the SOL 100 from the interior unit 12, the information is displayed on the display section 428. This displayed data may be, for example, “presently generating power” together with “generated power” (or “generated current, generated voltage”) or “current outputted to commercial power source” (when the voltage is constant) or the like. Further, when generation of power at the solar cell 102 is stopped at night or the like, the “presently generating power” display may be switched to, for example, “not generating power”. When a stoppage (interruption) of the commercial power source is detected, “interrupted” or the like is displayed. Further, when it is inputted to the microcomputer 56 of the interior unit 12 that there is an abnormality in the power generating function of the SOL 100, a predetermined error code expressing the abnormal state of the SOL 100 is displayed on the display section 428 of the remote control switch 44.

Operation of the present embodiment will now be explained by first describing air conditioning operation of an interior which is carried out by the interior unit 12 and the exterior unit 14 of the air conditioner 10.

In the operation-stopped state of the air conditioner 10, when the remote control switch 44 is operated and the operation mode, temperature, air amount, air direction and the like are set, these parameter values are converted into codes, and the codes are transmitted to the interior unit 12 from the remote control switch 44. At the interior unit 12, the codes transmitted from the remote control switch 44 are analyzed, and setting of the operation conditions is carried out on the basis of the results of this analysis. The exterior unit 14 is operated on the basis of the set operation conditions, and air conditioning operation of the interior begins.

Thereafter, when an operation signal is received from the remote control switch 44, the code of the received operation signal is analyzed, and the operation conditions are changed on the basis of the analyzed contents. In this way, the air conditioner 10 is operated by the interior unit 12 and the exterior unit 14 on the basis of operation of the remote control switch 44, and a desired air conditioning state is maintained.

Next, operation of the solar generator 11 will be described.

At the solar generator 11, when sunlight is illuminated onto the solar cell 102, the sunlight is converted into electric energy which is transmitted to the commercial power source supplying unit SOL 100. At the SOL 100, the power generated by the solar cell 102 is inputted to the inverter circuit 104.

The microcomputer 106 of the SOL 100 detects the power generated by the solar cell 102 (i.e., detects the current and the voltage), and detects the voltage, the frequency and the zero cross point $P_0$ of the commercial power source. On the basis of the results of detection, the microcomputer 106 outputs the switching signals $Sx_1$ through $Sy_2$ to the inverter circuit 104. Further, power for driving the switching elements X*a* through Y*b* is supplied to the inverter circuit 104 from the switching power source 108.

In the inverter circuit 104, the switching elements X*a* through Y*b* are driven on the basis of the switching signals $Sx_1$ through $Sy_2$ by the driving power supplied from the switching power source 108, and the direct current supplied from the solar cell 102 is converted to alternating current and outputted. At this time, power is supplied from the switching power source 108 to the individual switching elements X*a*, Y*a* which output the high side waveform. Further, power is supplied from the switching power source 108 to the switching elements X*b*, Y*b* which output the low side waveform, separately from the switching elements X*a*, Y*a* which output the high side waveform.

As a result, stable power can be supplied to the respective switching elements X*a* through Y*b*, and stable ac power corresponding to the power generated at the solar cell 102 is outputted from the inverter circuit 104. The output of the inverter circuit 104 becomes a sinewave via the transformer 118, and is supplied to the commercial power source.

The switching signals $Sx_1$ through $Sy_2$ are inputted to the inverter circuit 104 from the microcomputer 106 in accordance with the output of the solar cell 102 and the frequency and the voltage of the commercial power source. Therefore, power is outputted from the inverter circuit 104 with the voltage and frequency thereof being substantially the same as those of the commercial power source.

In the first embodiment, the operation state of the SOL 100 is displayed on the remote control switch 44 which is connected to the interior unit 12 of the air conditioner 10 by infrared rays or the like. However, the same display as that of the display section 428 of the remote control switch 44 may be effected at a display section 448 illustrated in FIG. 1 which displays the operation state of the interior unit 12.

In the first embodiment, the remote control switch 44 transmits and receives wireless signals (infrared ray signals). However, the interior unit and the remote control switch may be wire-connected (i.e., connected by signal lines).

[Second Embodiment]

Figure 16:
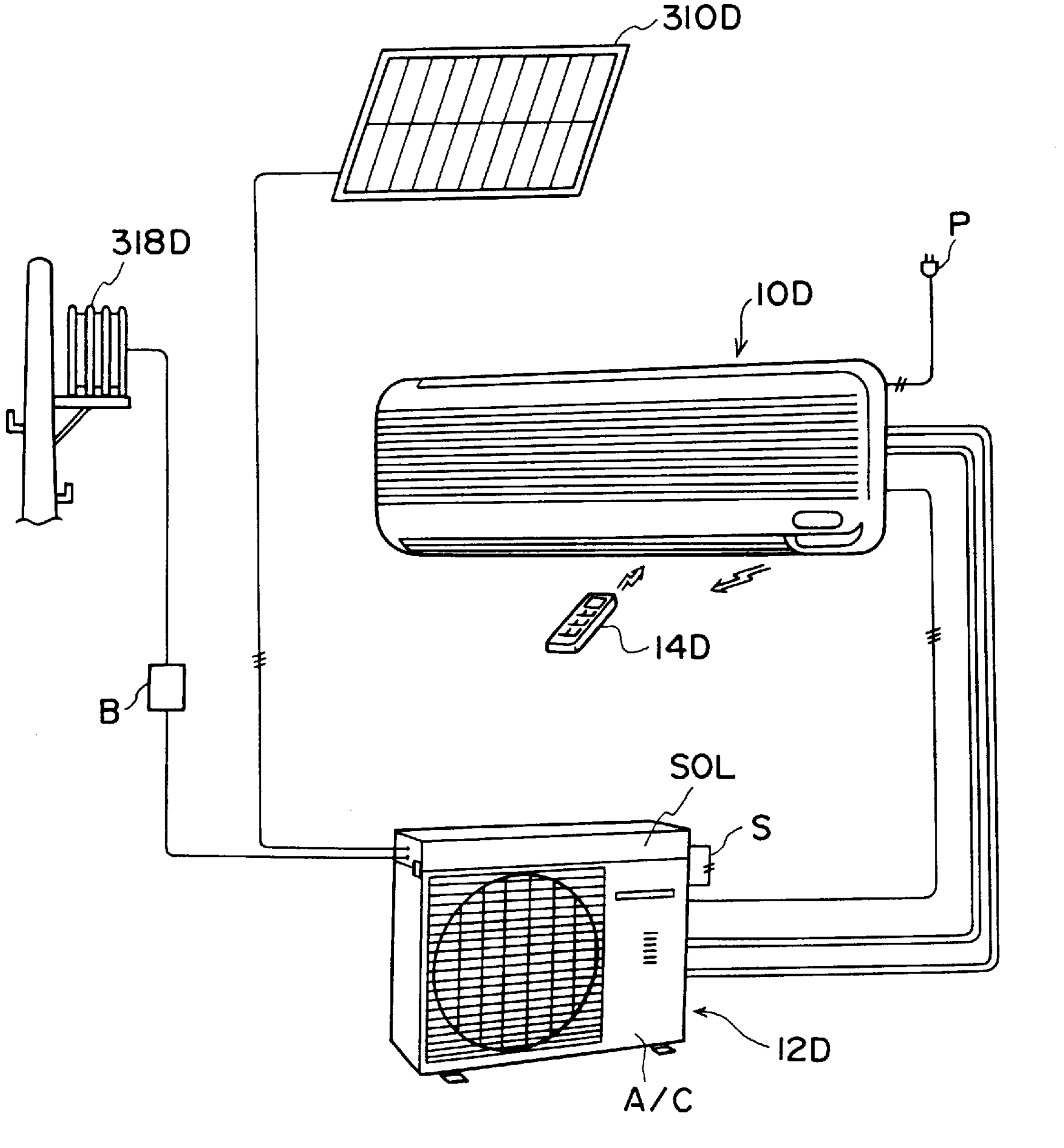
FIG. 16 is an external view of an air conditioner relating to a second embodiment.

FIG. 16 illustrates an air conditioner relating to a second embodiment of the present invention. The air conditioner includes an interior unit 10 and an exterior unit 12D which respectively have a refrigerant circulating path for circulating refrigerant. The air conditioner is provided with a remote control 14D for sending, by infrared rays, operation signals for operating the air conditioner by remote operation.

SOL is a commercial power source supplying mechanism, and a solar cell 310D is connected thereto. The commercial power source supplying mechanism SOL is a mechanism which is separate from the exterior unit of a usual air conditioner, and is joined to the top (or side) of the exterior unit 12D by screws. The SOL and the exterior unit 12D are connected by a signal line S. Hereinafter, an air conditioning section A/C and the commercial power source supplying unit SOL will be described separately.

[Air Conditioning Section A/C]

Various operation keys for, for example, power on/off, switching between cooling and heating, setting the temperature, setting the timer, and the like are provided at the remote control 14D. By operating the operation keys, operation signals having codes corresponding to the respective items are outputted. The remote control 14D is also provided with an air amount setting key so that the user can change the air amount to "low", "medium", "high", or "automatic setting". Hereinafter, a type of air conditioner in which the air amount can be changed to any of the above-described three levels (low, medium, high) will be described as an example in the second embodiment. These three setting levels are the basic structure for air amount adjustment. However, the present embodiment is also applicable to a structure in which the air amount can be changed to even more levels such as "breeze" or "high power", or to a structure in which the air amount can be changed along a continuous range without discrete levels such as described above.

In the second embodiment, wireless signals such as infrared rays or the like are used as the means for transmitting operation signals of the remote control 14D to the interior unit 10D. A light sensor 76BD (which will be described later) for receiving the infrared rays is provided at the interior unit 10D.

Here, when the operation signals transmitted from the remote control 14D are received at the light sensor 76BD of the interior unit 10D, the air conditioner controls the temperature, the humidity and the like of the interior in accordance with the codes of the received operation signals. Note that the remote control 14D and the interior unit 10D may be connected by signal lines. In this case, a generally known wired type remote control can be used.

Figure 17:
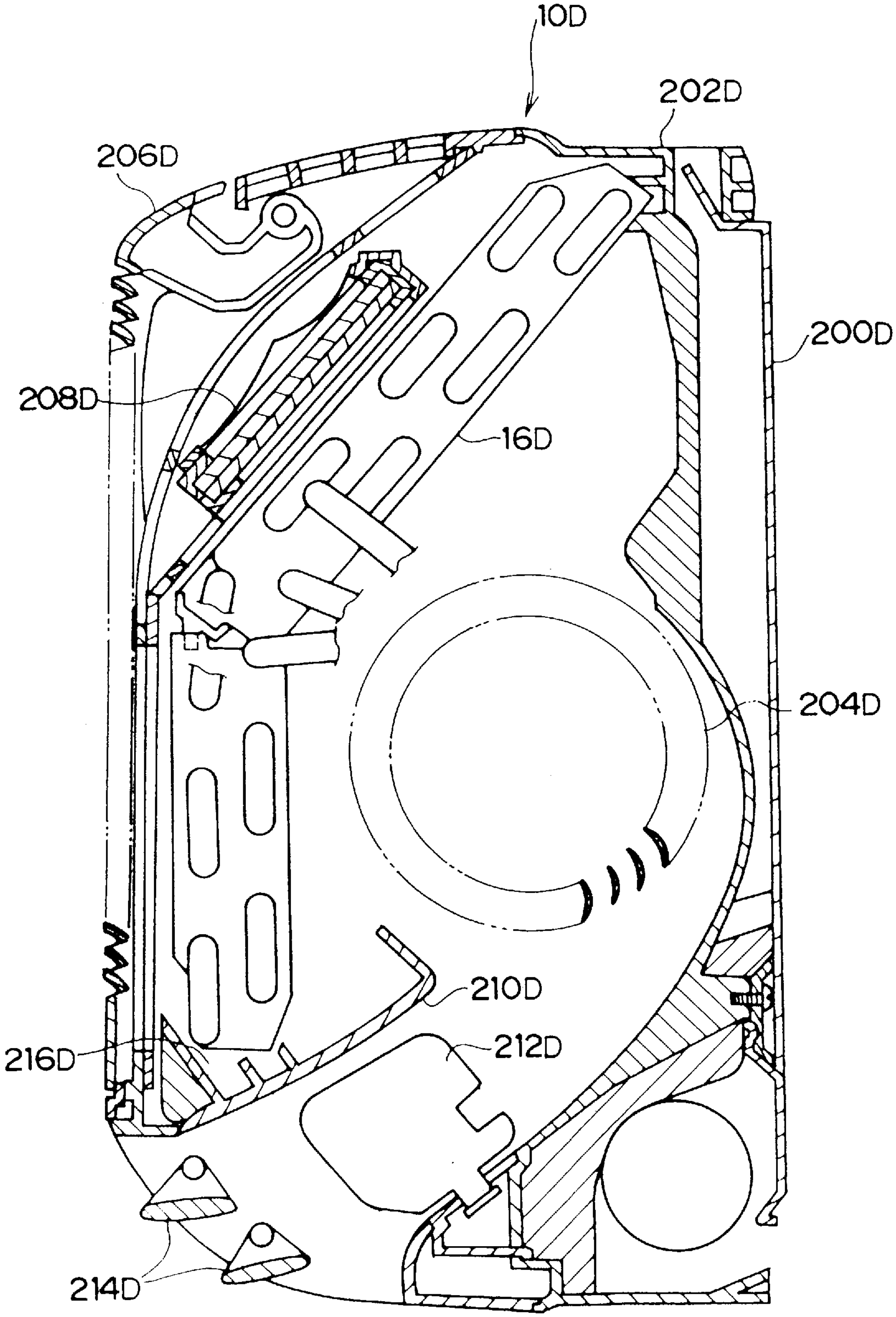
FIG. 17 is a side view illustrating an internal structure of an interior unit of the air conditioner relating to the second embodiment.

As illustrated in FIG. 17, the interior portion of the inside unit 10D is covered by a casing 202D which engages upper and lower ends of a mounting base 200D so as to be attachable to and removable from the mounting base 200D.

A cross flow fan 204D is provided at the central portion of the casing 202D. The cross flow fan 204D is driven by driving force of a fan motor 70ED (which will be described later), and serves to suck in interior air via various filters 208D and a heat exchanger 16D from a suction opening 206D provided in the casing 202D, as well as to send out air into the interior via an air path 210D. The air path 210D is provided with a transverse vane 212D and a horizontal flap 214D so that the direction in which the air is blown out to the interior can be adjusted.

A pan-shaped drain pan 216D is formed integrally with the portion of the casing 202D corresponding to the bottom portion of the heat exchanger 16D.

Figure 18:
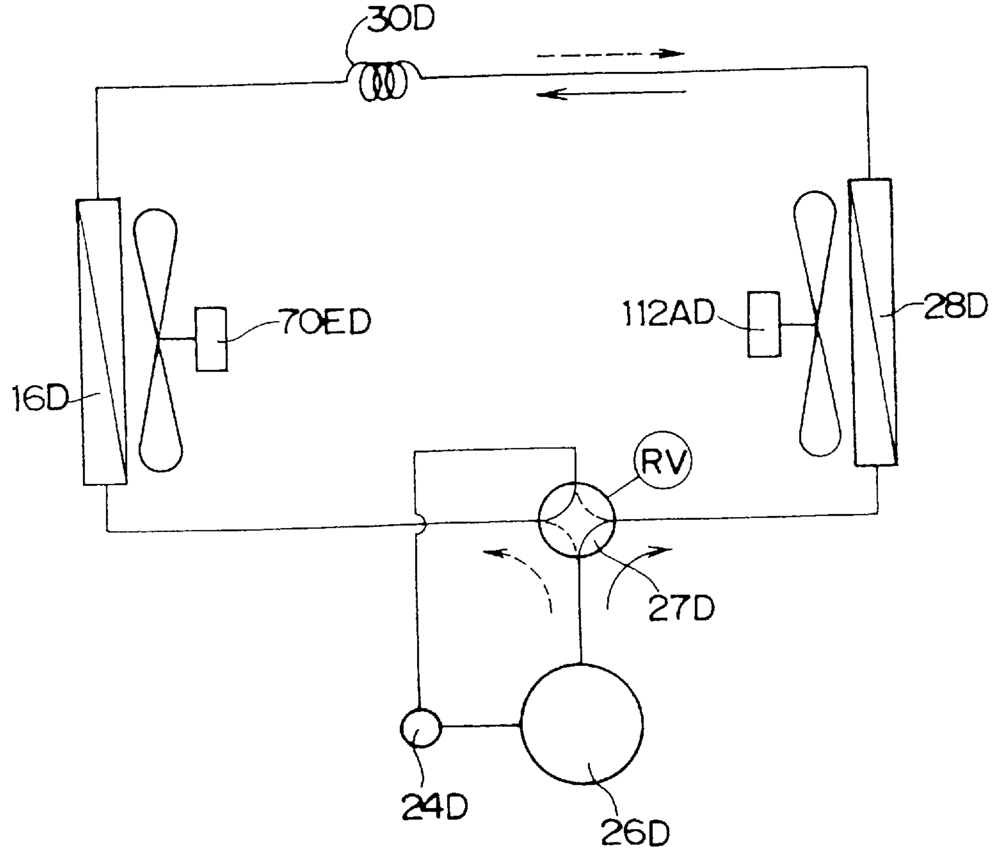
FIG. 18 is a schematic view of a refrigeration circuit of the air conditioner relating to the second embodiment.

FIG. 18 illustrates a refrigeration circuit of the air conditioner controlled by the control device of the second embodiment. In FIG. 18, 26D is a compressor, 27D is a four way type valve, 28D is an exterior side heat exchanger provided within the exterior unit 12D, 30D is a capillary tube (expansion device), 16D is the interior side heat exchanger provided within the interior unit 10D, and 24D is an accumulator. These elements are successively connected in a ring by refrigerant piping so as to form a refrigerating cycle. In accordance with this air conditioner, when the four way type valve 27D is in the state shown by the solid line in the figure (a power-off state), the refrigerant discharged from the compressor 26D flows in the direction of the solid line arrow, condenses at the exterior side heat exchanger 28D, and the pressure thereof is reduced at the capillary tube 30D. Thereafter, the refrigerant evaporates at the interior side heat exchanger 16D so that cooling of the interior is carried out. Further, when the four way type valve 27D is in the state illustrated by the broken line in the figure (a power-on state), the refrigerant discharged from the compressor 26D flows in the direction of the broken line arrow, condenses at the interior side heat exchanger 16D, and evaporates at the exterior side heat exchanger 28D so that heating of the interior is carried out.

Reference numeral 112AD is a fan motor forming the exterior side blower, and 70ED is the fan motor forming the interior side blower. The fan motor 112AD and the fan motor 70ED blow air to the exterior side heat exchanger 28D and the interior side heat exchanger 16D, respectively.

Figure 19:
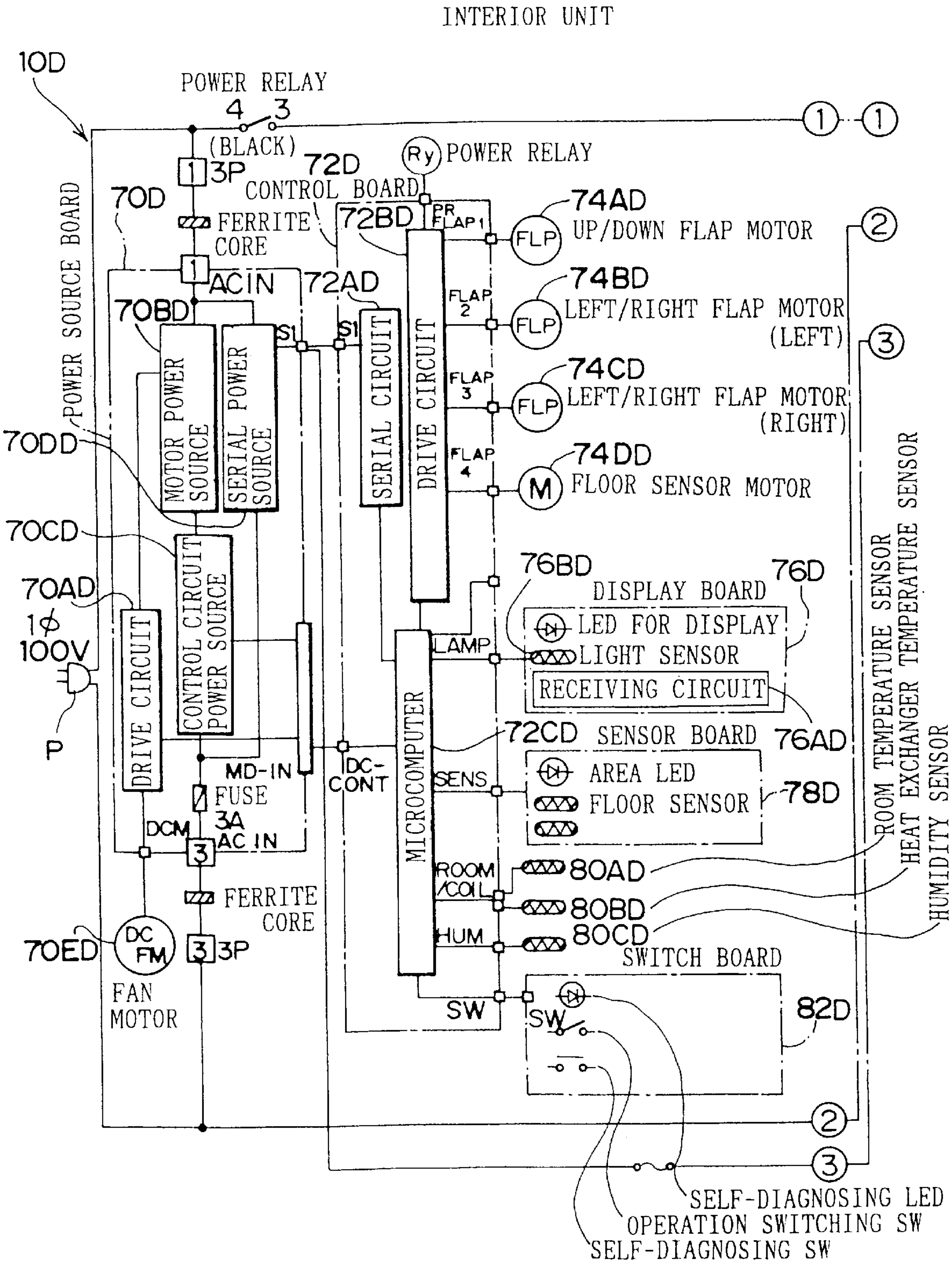
FIG. 19 is a circuit diagram of the interior unit of the air conditioner relating to the second embodiment.

FIG. 19 illustrates an electrical circuit of the interior unit 10D. The electrical circuit includes a power source board 70D and a control board 72D. The plug P, a drive circuit 70AD, a motor power source circuit 70BD, a control circuit power source circuit 70CD, and a serial circuit power source circuit 70DD are provided at the power source board 70D. The plug P is for obtaining power from an outlet (the commercial power source). The drive circuit 70AD drives the fan motor 70ED which adjusts the amount of air of the air conditioner supplied to the interior. The motor power source circuit 70BD generates power for driving the fan motor 70ED. The control circuit power source circuit 70CD generates power for a control circuit, and the serial circuit power source circuit 70DD generates power for a serial circuit.

A DC motor is used as the fan motor 70ED of the second embodiment. The voltage supplied to the fan motor 70ED is controlled by 8 bits. More specifically, the air amount can be set by voltage control of 256 steps. This is used to effect fine air amount control when the air amount is controlled when a 1/f fluctuation function is implemented.

A serial circuit 72AD which is connected to the serial circuit power source circuit 70DD, a drive circuit 72BD which drives motors, and a microcomputer 72CD which serves as a control circuit are provided at the control board 72D. The drive circuit 72BD supplies power for driving an up/down flap step motor 74AD for moving the flap up and down, left/right flap step motors 74BD, 74CD, and a floor sensor step motor 74DD for rotating and driving a floor sensor which detects the temperature of the floor surface in order to detect the temperature of the entire surface of the floor surface.

An LED for display, the light sensor 76BD and a receiving circuit 76AD are connected to the microcomputer 72CD. The LED for display is provided at a display board 76D and displays the operation mode or the like. The light sensor 76BD receives infrared ray operation signals from the remote control 14D. The receiving circuit 76AD receives the operation signals received by the light sensor 76BD.

The floor sensor, which is provided at a sensor board 78D, and an area LED, which is also provided at the sensor board 78D and which displays the temperature detection area of the floor surface, are connected to the microcomputer 72CD.

At the remote control 14D, control of the air conditioner is carried out. Examples of this control include selection of the mode (such as heating mode, cooling mode, dry mode, automatic operation mode or the like), changing of the set temperature, changing of the amount of air blown out, changing of the flap angle by driving the flap step motors 74AD, 74BD, 74CD, and the like.

Moreover, a room temperature sensor 80AD which detects the room temperature, a heat exchanger temperature sensor 80BD which detects the temperature of the interior heat exchanger 16D, and a humidity sensor 80CD which detects the humidity of the interior are connected to the microcomputer 72CD. A LED for self-diagnosing, an operation switching switch for switching the operation mode to heating mode, cooling mode, dry mode or automatic change mode, and a self-diagnosing switch, all of which are provided at a switch board 82D, are also connected to the microcomputer 72CD.

A "heating mode" display, a "cooling mode" display, a "dry mode" display, and an "automatic change mode" display are provided at the operation switching switch. The state which is currently switched to is displayed on the LED for display provided at the display board 76D.

Figure 20:
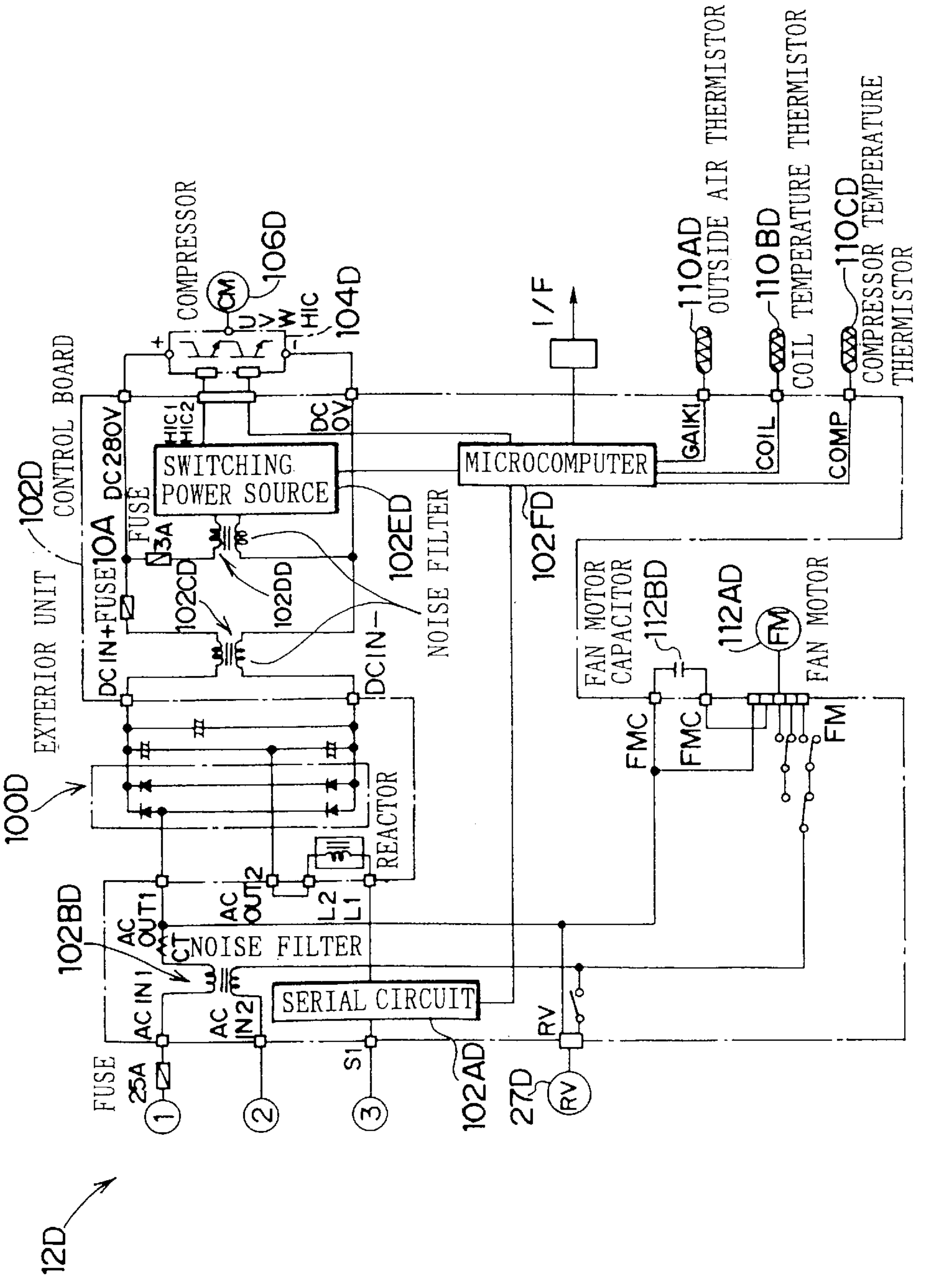
FIG. 20 is a circuit diagram of an exterior unit of the air conditioner relating to the second embodiment.

FIG. 20 illustrates an electrical circuit of the exterior unit 12D. The electrical circuit is provided with a rectifier circuit 100D and a control board 102D. The electrical circuit of the exterior unit 12 is connected to the electrical circuit of the interior unit 10D illustrated in FIG. 19 at ①, ②, ③.

A serial circuit 102AD connected to the serial circuit power source circuit 70DD of the interior unit 10D, noise filters 102BD, 102CD, 102DD for eliminating noise, a switching power source circuit 102ED which generates power for switching an inverter 104D, and a microcomputer 102FD serving as a control circuit are provided at the control board 102D.

The inverter 104D is connected to the switching power source circuit 102ED. The compressor 26D which compresses the refrigerant is connected to the inverter 104D.

Connected to the microcomputer 102FD are an outside air temperature thermistor 110AD which detects the temperature of the outside air and serves as an outside air temperature sensor, a coil temperature thermistor 110BD which detects the temperature of the exterior side heat exchanger 28D and serves as a coil temperature sensor, and a compressor temperature thermistor 110CD which detects the temperature of the compressor 26D and serves as a temperature sensor.

I/F is an interface circuit which transmits signals from the commercial power source supplying mechanism SOL to the microcomputer 102FD.

The fan motor 112AD, which blows air to the exterior side heat exchanger 28D, and a fan motor capacitor 112BD are connected to the noise filter 102BD. Parallel to the fan motor 112AD and the fan motor capacitor 112BD, the four way type valve 27D, which changes the flowing direction of the refrigerant discharged from the compressor 26D, obtains driving power from the power passing through the noise filter 102BD.

[Commercial Power Source Supplying System SOL]

Figure 21:
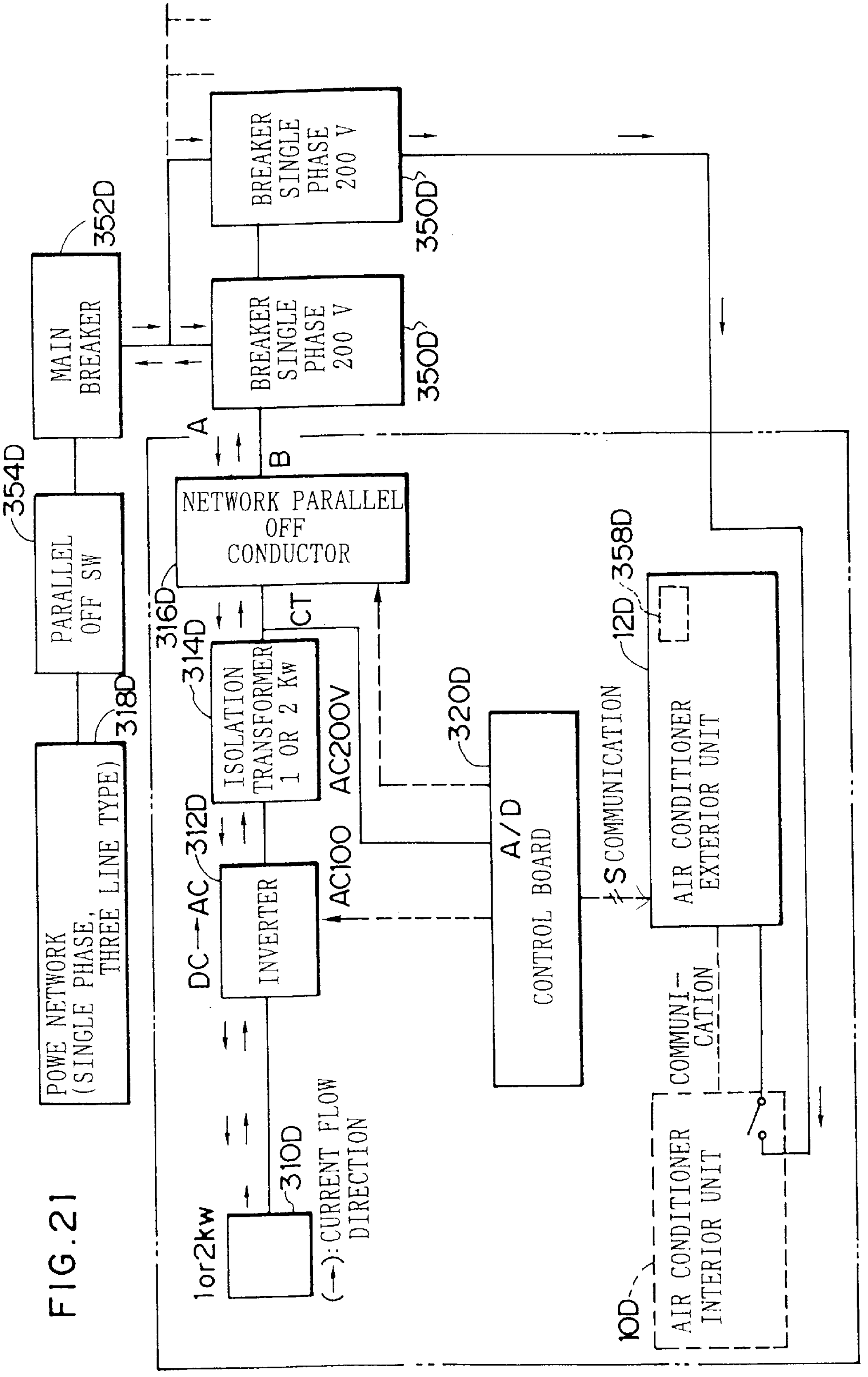
FIG. 21 is a schematic view of a commercial power source supplying system relating to the second embodiment.

FIG. 21 illustrates the commercial power source supplying system which supplies to the commercial power source power generated by using sunlight as an energy source.

At the solar cell 310D which absorbs sunlight, a plurality of modules are set in a frame, and the solar cell 310 is set on a roof or the like. The energy absorbed by the solar cell 310D is supplied to an inverter circuit 312D. More specifically, the power generated at the solar cell 310D is direct current, and is converted into alternating current by the inverter circuit 312D.

The converted ac power is supplied to an isolation transformer 314D, and is adjusted to the same power source frequency as that of the commercial power source (e.g., a sinewave of 200 v, 50 Hz). The output side of the isolation transformer 314D is connected, via a parallel off conductor 316D and via one of breakers 350D which are provided per predetermined block and via a main breaker 352D, to a parallel off switch 354D which carries out parallel-off with the exterior. The parallel off switch 354D is connected to a transformer 318D which is the branch end of the power network disposed in a telegraph pole or the like. Power of a predetermined voltage (e.g., single phase 200 v) is supplied from a power company substation to the primary side of the transformer 318D.

At the transformer 318D, the voltage at the primary side is stepped down to the commercial voltage (e.g., 200 v) (secondary side voltage).

Accordingly, power is usually supplied from the secondary side of the transformer 318D to an ordinary household as illustrated by arrows A in FIG. 21.

On the other hand, power generated by the solar cell 310D is supplied to the secondary side of the transformer 318D as illustrated by arrows B in FIG. 21, so as to increase the power capacity.

A microcomputer 320D for controlling the inverter circuit 312D monitors the voltage inputted at the A/D converter and the current from the current transformer (CT) and controls the switching operation of the inverter circuit 312D so that the solar cell 310D operates optimally.

Further, control of the opening and closing of the parallel off conductor 316D provided between the transformer 314 and the transformer 318D is also carried out at the microcomputer 320D. The parallel off conductor 316D has a switching function for either supplying power generated at the solar cell 310D to the transformer 318D or cutting off the supply. The microcomputer 320D controls this on and off operation.

The microcomputer 320D computes the power passing through the isolation transformer 314D, and transmits this value to the exterior unit of the air conditioner via the signal line S.

In the above-described structure, the microcomputer 102FD (see FIG. 20) at the exterior unit 12D of the air conditioning section A/C and the microcomputer 320D at the commercial power source supplying unit SOL are provided separately. When such an air conditioner is installed in a house or the like, because the air conditioner itself receives power from the commercial power source as is the case with ordinary air conditioners, the consumed power does not change. However, regardless of whether the air conditioner is being operated or not being operated, at the commercial power source supplying unit SOL, the power generated from sunlight is always returned to the commercial power source side. Therefore, the returned power is subtracted from the power used by the entire house, which as a result contributes to a savings in energy.

The second embodiment includes a generated power detecting section which detects the power amount of the generated power which is generated by the solar cell 310D and converted to commercial power (computation from the voltage and current), and an air conditioner consumed power detecting sensor (unillustrated) which detects the power consumed by the air conditioner (computation from the voltage and the current value from the CT). The generated power detecting section and the air conditioner consumed power detecting sensor are connected to the microcomputer of the control board 320D and the microcomputer 102FD, respectively. A detected value of a generated power detecting sensor (unillustrated) inputted to the microcomputer 320D is transmitted to the microcomputer 102FD of the air conditioner by communication. At the microcomputer 102FD, these detected values are compared, and when a predetermined switch is effective, the operation capability is controlled at the microcomputer. More specifically, the operation capability of the air conditioner is controlled such that the power consumed by the air conditioner does not exceed the generated power, and the supply of power and the consumption of power offset one another. When the predetermined switch is not effective, ordinary operation as the first embodiment is performed.

Hereinafter, operation of the second embodiment of the present invention will be described. First, ordinary operation at the air conditioning section A/C will be described.

In the operation stopped state, when the remote control 14 is operated and the outputted operation signal is received by the receiving circuit 7BAD, the code of the received operation signal is analyzed.

It is judged whether the results of analysis are an order to turn the power source on or not or an order to set the timer or not. More specifically, when the power source is off, the operation signal from the remote control 14D such as temperature settings, air amount settings and the like are canceled. Therefore, the operation signal is not received in this case, and the air conditioner stands by in a receiving state.

Here, when an order to set the timer is recognized, the operator of the remote control 14D sets the timer so that the air conditioner will be operated a predetermined time thereafter. For example, the timer is set so that the air conditioner will operate two hours later, the remote control 14D is operated, and the operation signal is outputted. In this way, the timer (start time) is set. Due to this setting, operation automatically begins two hours later.

On the other hand, when an order to turn the power source on is recognized, operation of the air conditioner begins in the mode which was set before operation of the previous time was stopped.

Thereafter, when an operation signal is received from the remote control 14D, the code of the received operation signal is analyzed, and it is judged whether the analyzed contents are an order to turn the power source off or not, or an air amount setting (change) or not, or a temperature setting (change) or not, or a timer setting (change) or not. The item corresponding to the analyzed contents is selected, and stopping of operation or setting/changing of the operation mode is effected.

At the air conditioning section A/C, the microcomputer 72CD of the interior unit 10D collates by fuzzy computation the variation in the difference between the set temperature/set humidity and the temperature/humidity of the room to be air conditioned. The microcomputer 72CD computes an amount of increase or decrease in the present air conditioning capability for the needed air capability.

This amount of increase or decrease is expressed by the rotational frequency of a compressor 106D, and is expressed by the frequency in particular when the compressor 106D is the drive source of the induction motor.

The amount of increase or decrease is transmitted to the microcomputer 102FD of the exterior unit 12D via a signal line connecting the interior unit 10D and the exterior unit 12D.

The microcomputer 102FD of the exterior unit 12D corrects the present frequency (the frequency of the ac power supplied to the compressor 106D) in accordance with the amount of increase or decrease of the frequency, so as to operate the compressor 106D at the new frequency. Note that starting-up and stopping of the compressor 106D are effected in accordance with different processes.

The microcomputer 102FD of the exterior unit 12D continuously samples the current consumed at (supplied to) the compressor 106D, and corrects the frequency so that this current does not exceed a predetermined value, e.g., does not exceed the capacity of the breaker (i.e., 20 A or the like) at an ordinary household.

More specifically, if the current exceeds [a predetermined value −2 A], correction in which the frequency is raised is prohibited. If the current exceeds [a predetermined value −1 A], correction in which the frequency is lowered at a rate of 1 Hz/sec is carried out. This lowering correction continues until the current is [a predetermined value −3A].

Next, operation at the commercial power source supplying unit SOL will be described.

At usual times, i.e., when power is supplied to the transformer 318D, the parallel off conductor 316D is in a closed state.

The sunlight absorbed by the solar cell 310D is converted into electrical energy which is then supplied to the inverter circuit 312D. The power at this time is direct current, and at the inverter circuit 312D, this DC power is converted into AC power. At this time, the power source voltage and the frequency of the region are transmitted to the inverter circuit 312D from the microcomputer 320D, and the inverter circuit 312D converts the DC power to AC power (voltage and frequency) matching that of the region. Note that the frequency of the region can be obtained by analyzing a voltage waveform given to the A/D terminal via the breaker before generation of power begins.

The waveform converted by the inverter circuit 312D is converted into a sinewave by the isolation transformer 314D. In a case in which the parallel off converter 316D is closed, the sinewave can be supplied to the secondary side of the transformer 318D as illustrated by the arrows B in FIG. 21.

Here, in the second embodiment, the power generated by the commercial power source supplying unit SOL is detected by the generated power detecting sensor 356D, and the power consumed by the air conditioner section A/C is detected by the consumed power detecting sensor. Controlling of the operation capability of the air conditioner may be effected in accordance with the results of comparison of the generated power and the consumed power.

More specifically, when there is a room for which continuous air conditioning is desired and the air conditioner is always left on, it is uncertain how much power will be consumed, and electricity costs which will be offset by the generated power cannot be predicted. Accordingly, there is a need to plan for adjustments to the consumed power when the operation state becomes weak or operation stops in rainy weather or at night. However, in the second embodiment, when the predetermined switch is set to be effective, the value of the generated power sent from the SOL is substituted by the aforementioned predetermined value for current control or by a value which is 1 A less than this value. Therefore, the operation capability of the air conditioner is controlled in accordance with the generated power. Accordingly, the air conditioner is always operated within the range of generated power. More specifically, in cases in which sunlight is sufficiently absorbed and there is sufficient generated power such as times when the sky is clear or the like, even if the air conditioner is driven at full capability, the consumed power does not exceed the generated power. Further, when the amount of generated power decreases such as during rainy weather, control is effected such that the operation capability of the air conditioner is lowered and the consumed power does not become greater than or equal to the decreased generated power.

Due to this type of control, because the air conditioner is always operated at full capability, all of the power consumed by the air conditioner can be provided by the generated power and electricity costs become unnecessary, without impractical accommodations such as making the solar cell 310D large.

In the second embodiment, the consumed power is controlled so as to not exceed the generated power. However, it is not necessary for the consumed power to be completely furnished by generated power. If the consumed power is controlled such that a predetermined portion thereof (e.g., 80%) is provided by the generated power, the air conditioner can be operated continuously for a long time by consuming only a small amount of commercial power (which can be estimated by computation) and without an extreme lowering of the operation capability.

[Third Embodiment]

In the air conditioner of a third embodiment, which is a variation of the second embodiment, the exterior unit 12D of the air conditioner section A/C and the commercial power source supplying unit SOL are controlled in common by the same microcomputer 102FD (see FIG. 20). When this type of air conditioner is set at a house or the like, the air conditioner itself carries out air conditioning operation while obtaining power from solar power and obtaining, from the commercial power source, the necessary power not obtained from the solar power.

In the air conditioner of the third embodiment, in addition to the same ordinary operation as the first embodiment, energy saving operation can be carried out by switching a predetermined switch. More specifically, the air conditioner of the third embodiment has the generated power detecting sensor, which detects the amount of the generated power which is generated by the solar cell 310D and converted into commercial power, and the air conditioner consumed power detecting sensor which detects the power consumed by the air conditioner. The generated power detecting sensor and the consumed power detecting sensor are connected to the microcomputer 102FD. When the aforementioned switch is in the effective state, at the microcomputer 102FD, these detected values are compared and the operation capability of the air conditioner is controlled. More specifically, the value detected by the generated power detecting sensor is set to a predetermined value for current control and the maximum operation capability of the air conditioner is controlled so that the power consumed by the air conditioner does not exceed the generated power. The supply of power from the solar cell 310D and the power consumed at the air conditioner offset one another.

In the air conditioner of the third embodiment, an ordinary operation mode and an energy saving operation mode can be selected.

[Ordinary Operation Mode]

The main power source of the ordinary operation mode is the commercial power source supplying unit SOL, and the air conditioner is operated by power generated by solar energy. However, because solar energy is affected by the season, the time of day and the weather, there are cases in which sufficient power cannot be obtained, and this insufficiency is compensated for power provided from the commercial power source. In this way, the air conditioner can always be maintained in a full operating state.

Further, while the air conditioner is not being operated, DC/DC operation is stopped, and power generated by using sunlight as an energy source is supplied only to the commercial power source.

More specifically, the sunlight absorbed by the solar cell 310D is converted to electrical energy which is then supplied to the inverter circuit 312D. The power at this time (electrical energy) is direct current. The inverter circuit 312D converts this DC power into AC power of a predetermined frequency and a predetermined voltage.

The high frequency component of the quasi-sinewave which was converted at the inverter circuit 312D based on PWM theory, is reduced by the isolation transformer 314D so that the quasi-sinewave is converted to a waveform which is close to a sinewave. At this time, if the parallel off conductor 316D is in a closed state, the waveform which is close to the commercial power source can be supplied to the secondary side of the transformer 314D as illustrated by arrows B in FIG. 21.

In this way, when the air conditioner is being operated in the ordinary operation mode, the power obtained from sunlight is preferentially supplied to the air conditioner, and any insufficiency is compensated for by commercial power. When the air conditioner is not being operated (while air conditioning operation is not being carried out), the power obtained by using sunlight as an energy source is returned to the commercial power source. Therefore, consumption of commercial power can substantially be reduced.

[Energy Saving Operation Mode]

When an energy saving operation mode is selected, the power which is obtained by using sunlight as the energy source and which is supplied preferentially is detected by the generated power detecting sensor, and the power consumed by the air conditioner section A/C is detected by the consumed power detecting sensor. Control of the air conditioner operation capability is effected in accordance with the results of comparison of the generated power and the consumed power.

More specifically, when there is a room for which continuous air conditioning is desired and the air conditioner is operated continuously, it is uncertain how much power will be consumed, and electricity costs which will be offset by the generated power cannot be predicted. Accordingly, there is a need to plan adjustments to the consumed power when the operation state becomes weak or operation stops in rainy weather or at night. However, in this embodiment, the operation capability of the air conditioner is controlled in accordance with the generated power, and the air conditioner is always operated within the range of the generated power. More specifically, in cases in which sunlight is sufficiently absorbed and there is sufficient generated power such as times when the sky is clear or the like, even if the air conditioner is driven at full capability, the consumed power does not exceed the generated power. Further, when the amount of generated power decreases such as during rainy weather, control is effected such that the operation capability of the air conditioner is lowered and the consumed power does not become greater than or equal to the decreased generated power.

Due to this type of control, in order to handle a temporary full capability operation of the air conditioner, all of the power consumed by the air conditioner can be provided by the generated power such that electricity costs become unnecessary, without impractical accommodations such as making the solar cell 310D large.

What is claimed is:

1. An air conditioner comprising:

an air conditioning operation section which effects air conditioning operation of an interior to be air-conditioned by circulating a refrigerant in a refrigerant circuit including an interior unit provided in the interior and an exterior unit provided at an exterior;

a power-generating section provided at the exterior for absorbing sunlight and generating electric power from the sunlight;

an inverter section converting the electric power generated at said power generating section into AC power having a voltage and a frequency that can be joined to a commercial AC power source, and outputting the converted AC power to the commercial AC power source, wherein said operation information displayed by said display section includes the electric power generated by said power-generating section and outputted current or power outputted from said inverter section to the commercial source;

a remote controller, separate from the air conditioner, for setting operating conditions of the air conditioner; and a display section, installed either in the remote controller or the interior unit of the air conditioner, for displaying operation information of said electric power generating section.

2. An air conditioner having a refrigerating cycle which circulates refrigerant and includes a compressor, a condenser, an expansion device and an evaporator, heat exchange is effected between the refrigerant and air supplied to an interior, to carry out air-conditioning operation of the interior by supplying air which has been subjected to heat exchange to the interior so that at least one of a temperature or a humidity of the interior changes to a desired state, said air conditioner equipped with a commercial power source-supplying function for generating power by using sunlight as an energy source and supplying the generated power to a commercial power source, said air conditioner further comprising:

a rectifier/smoothing section for converting alternating current power supplied from the commercial power source into direct current power;

an inverter section for permitting the direct current power obtained from said rectifier/smoothing section to pass through intermittently the compressor in response to signals, for controlling a revolution of the compressor;

a rotation-controlling section for outputting to said inverter section the signals to change at least one of the temperature or the humidity of the interior to a desired state;

a power-supplying section for merging the power generated by using sunlight as an energy source with direct current power outputted from said rectifier/smoothing section; and a control section for allocating the sunlight-generated power between the compressor and the commercial power source, wherein the power generated by using sunlight as an energy source is preferentially merged with the direct current power outputted from said rectifier/smoothing section when said air conditioner is carrying out air conditioning operation, whereas the power generated by using sunlight as an energy source is preferentially supplied to the commercial power source when said air conditioner is not carrying out air conditioning operation, said control section comprising:

a first power-detecting section for detecting the power generated by using sunlight as an energy source;

a second power-detecting section for detecting either one of power consumed at said air conditioner or power consumed at the compressor; and a regulating section for correcting the revolution of the compressor to maintain a value detected by said second power-detecting section less than or equal to a value detected by said first power-detecting section.

3. An air conditioner according to claim 2, wherein a portion of said air conditioner effecting air conditioning operation and a portion of said air conditioner having the function for supplying to the commercial power source the power generated by using sunlight as an energy source are controlled by the same microprocessor.

4. An air-conditioning system using solar energy, comprising:

a power generator for generating direct current power by absorbing sunlight;

an inventor system for converting the direct current power generated by said power generator into an alternating current power in such a way that the current of the converted alternating current power coincides with alternating current supplied by an external current power source, said inverter system connected to said power generator and to said external current power source, wherein said inverter system converts the direct current into an alternating current having a quasi-sinewave having a phase matching the phase of the alternating current from said external current power source, in which the phase-matching is conducted based on a zero-cross point at which an instantaneous value of the alternating current of said external power source becomes zero;

an air-conditioning apparatus for air-conditioning a defined space, said air-conditioning apparatus comprising a refrigerant circulation line in which a condenser, an evaporator, an expansion valve, and a compressor are provided, said compressor driven by current supplied from at least either said power generator or said external current power source; and a control system for controlling current supplied to said compressor in such a way that when the direct current power generated by said power generator is insufficient to drive said compressor, the insufficient power is compensated for by current power from said external current power source, and when the direct current power generated by said power generator is in excess of the power consumption of said compressor, the excess power is merged into said external current power source via said inventor system.

5. An air-conditioning system according to claim 4, further comprising a monitor for monitoring power generation performance of said power generator.

6. An air-conditioning system according to claim 4, further comprising a switch provided between said power generator and said external current power source, said switch electrically disconnecting said power generator and said external current power source in the event of a power cut of the external current power.

7. An air-conditioning system according to claim 4, further comprising a rectifier for converting the alternating current from said external current power source into direct current; and a second inverter system for changing the direct current from at least either said power generator or said external current power source into a current which controls the rpm's of said compressor.

8. An air-conditioning system according to claim 7, wherein said second converter system controls the rpm's of said compressor in such a way that power consumption of said compressor is not higher than the current power generated by said power generator.

9. A method for air-conditioning a defined space using solar energy, comprising the steps of:

(a) generating direct current power by absorbing sunlight;

(b) determining a zero-cross point at which an instantaneous value of the alternating current of an external power source becomes zero;

(c) converting the generated direct current power into an alternating current power in such a way that the current of the converted alternating current power coincides with alternating current supplied by an external current power source, said alternating current having a quasi-sinewave having a phase matching the phase of the alternating current from said external current power source based on the determined zero-cross point;

(d) air-conditioning a defined space using an air-conditioning apparatus comprising a refrigerant circulation line in which a condenser, an evaporator, an expansion valve, and a compressor are provided, said compressor driven by at least either the generated current power or the external current power; and (e) controlling current supplied to said compressor in such a way that when the generated current power is insufficient to drive said compressor, the insufficient power is compensated for by the external current power, and when the generated current power is in excess of the power consumption of said compressor, the excess power is merged into said external current power source upon the conversion of the generated current power in step (c).

10. A method according to claim 9, further comprising the step of monitoring power generation performance in step (a).

11. A method according to claim 9, further comprising the step of disconnecting the generated current power from said external current power source in the event of a power cut of the external current power.

12. A method according to claim 9, further comprising, prior to step (c), the steps of converting the alternating current from said external current power source into direct current; and changing the direct current of at least either the generated current power or the external current power into a current for controlling the rpm's of said compressor.

13. A method according to claim 12, wherein, in step (c), the rpm's of said compressor is controlled in such a way that the power consumption of said compressor is not higher than the generated current power.

* * * * *